United States Patent
Shukuri et al.

(10) Patent No.: US 6,856,054 B2
(45) Date of Patent: Feb. 15, 2005

(54) BRUSHLESS DC MOTOR, PUMP, AND ELECTRONIC APPARATUS

(75) Inventors: Yoichi Shukuri, Fukuoka (JP); Kyo Niwatsukino, Fukuoka (JP); Yoshimitsu Aizono, Fukuoka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 104 days.

(21) Appl. No.: 10/251,988

(22) Filed: Sep. 23, 2002

(65) Prior Publication Data

US 2003/0057781 A1 Mar. 27, 2003

(30) Foreign Application Priority Data

Sep. 25, 2001 (JP) .................................. 2001-291615
Sep. 25, 2001 (JP) .................................. 2001-291617

(51) Int. Cl.$^7$ .............................................. H02K 11/00
(52) U.S. Cl. ................................. 310/68 B; 310/67 R
(58) Field of Search ................................. 310/68 B, 71,
310/67 R, DIG. 6; 320/254, 258, 259, 216, 217, 218

(56) References Cited

U.S. PATENT DOCUMENTS

| | | | | |
|---|---|---|---|---|
| 2,488,734 A | * | 11/1949 | Mueller | 336/135 |
| 2,596,711 A | * | 5/1952 | Mueller | 310/49 R |
| 4,115,715 A | * | 9/1978 | Muller | 310/68 B |
| 4,549,104 A | * | 10/1985 | Niimura et al. | 310/67 R |
| 4,734,603 A | * | 3/1988 | von der Heide et al. | 310/72 |
| 5,015,893 A | * | 5/1991 | Shiozawa | 310/67 R |
| 5,256,922 A | * | 10/1993 | Tanaka et al. | 310/71 |
| 5,469,005 A | * | 11/1995 | Asama et al. | 310/68 B |
| 5,705,866 A | * | 1/1998 | Oguchi | 310/67 R |
| 5,825,108 A | * | 10/1998 | De Filippis | 310/67 R |

FOREIGN PATENT DOCUMENTS

| | | |
|---|---|---|
| JP | 62-89461 | 4/1987 |
| JP | 5-68362 | 3/1993 |
| JP | 5-122878 | 5/1993 |
| JP | 6-80371 | 11/1994 |
| JP | 2001-078381 | 3/2001 |

* cited by examiner

*Primary Examiner*—Dang Le
(74) *Attorney, Agent, or Firm*—Wenderoth, Lind & Ponack L.L.P.

(57) ABSTRACT

A brushless DC motor includes a substrate fixed to the center of a stator core. The substrate includes a central substrate portion and an arm substrate portion extending from the central substrate to a salient pole. The arm substrate is accommodated between coils. A driver IC is mounted on the central substrate portion, and a magnetic pole position sensor is mounted on the arm substrate portion. This structure provides a thin brushless DC motor which assures good motor performance and stable noise and vibration levels, improves motor efficiency, and reduces the number of components and assembling steps.

43 Claims, 19 Drawing Sheets

Fig. 19  PRIOR ART
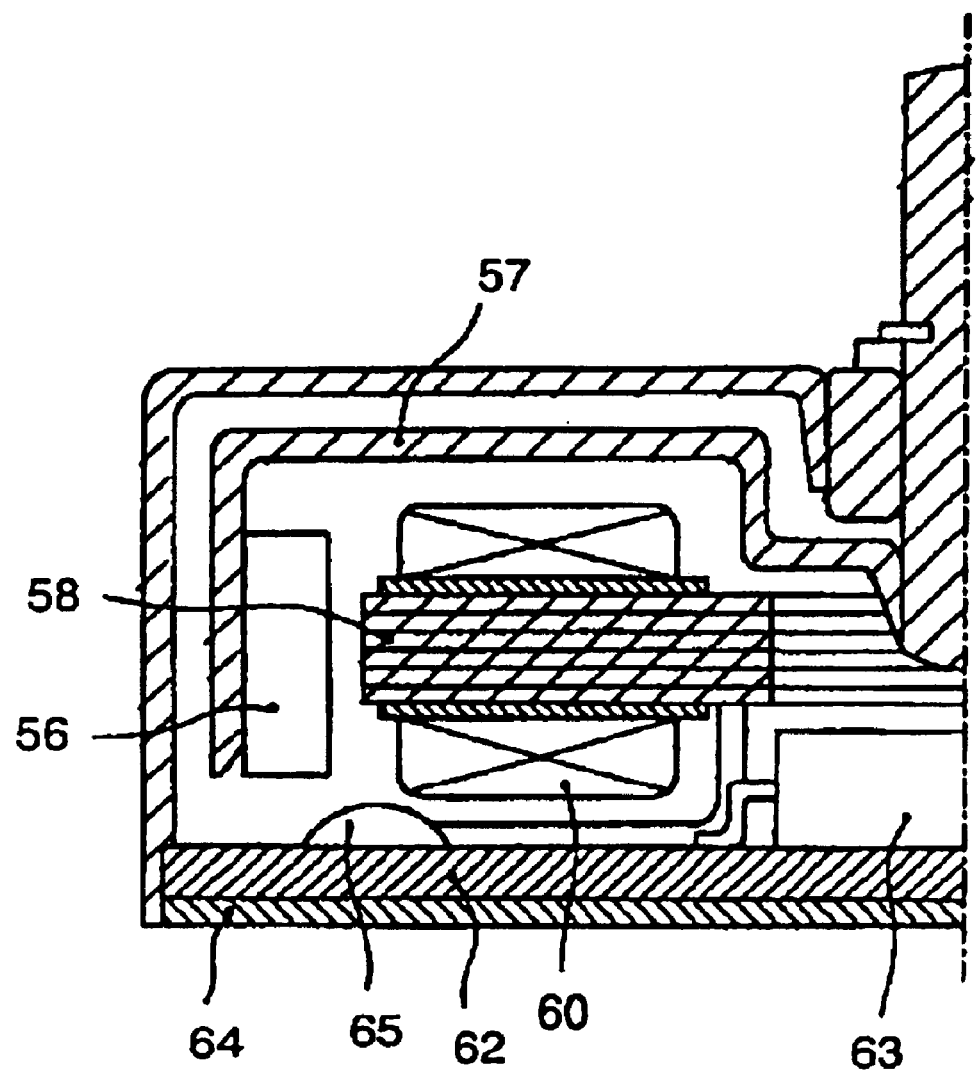

BRUSHLESS DC MOTOR, PUMP, AND ELECTRONIC APPARATUS

FIELD OF THE INVENTION

The present invention relates to brushless DC motors including a position sensor and a driver IC, and to pumps and electronic apparatuses including the motors.

BACKGROUND OF THE INVENTION

A conventional brushless DC motor is controlled by a driver IC which switches a current direction based on the position of a magnetic pole detected by a magnetic pole position sensor, such as a Hall element. It is difficult to make the conventional motor thin since the motor, which has an armature including a motor core (stator core) and a coil wound around the stator core, is necessary to dispose the coil and the magnetic pole position sensor.

However, smaller, thinner brushless DC motors are demanded.

A conventional thin brushless DC motor disclosed in the Japanese Laid-open Patent No.5-68362 will be described. FIG. 19 shows the configuration of the thin brushless DC motor.

As shown in FIG. 19, a conventional brushless DC motor includes magnet rotor 56 around armature 58. Driver IC 63 which drives the motor through switching a current flowing in coil 60 of armature 58 is provided on substrate 62, and is disposed at the center of armature 58. Substrate 62 on which driver IC 63 is mounted is placed on shielding board 64 and is fixed to armature 58. Rotatable magnet rotor 56 is held by rotor frame 57, and is disposed at a position opposing armature 58.

Magnetic pole position sensor 65 for detecting the position of a magnetic pole of magnet rotor 56 is disposed on substrate 62. Driver IC 63 receives a signal output by magnetic pole position sensor 65, and controls the current flowing in coil 60 of armature 58. This allows armature 58 to operate as an electromagnet, and to generate a rotation torque on the magnet rotor by attraction and repulsion between magnet rotor 56 and the magnetic pole.

In the above conventional brushless DC motor, substrate 62 on which magnetic pole position sensor 65 and driver IC 63 are provided is disposed with a gap from a coil end of the stator core of armature 58. Therefore, the position of the coil end and the thickness of substrate 62 restrict the thickness of the motor. This restriction limits thinning of the conventional brushless DC motor.

SUMMARY OF THE INVENTION

A motor includes an armature, magnet rotor, sensor, driver, and substrate. The armature includes a stator core which has plural teeth and plural salient poles on a tip of each tooth, and plural coils wound around teeth, respectively. The magnet rotor is disposed at a position opposing the salient poles. The sensor detects a magnetic pole position of the magnet rotor. The driver controls respective currents flowing in the coils, according to a signal output by the sensor. The substrate is disposed at the center of the, stator core, and includes a center substrate for mounting the driver and an arm substrate which extends from the center substrate to the salient pole. The arm substrate is disposed between two coils of the plural coils for accommodating the sensor.

BRIEF DESCRIPTION OF THE DRAWINGS

FIG. 19 shows a configuration of a conventional brushless DC motor.

DESCRIPTION OF THE PREFERRED EMBODIMENT

Exemplary Embodiment 1

Figure 1A:
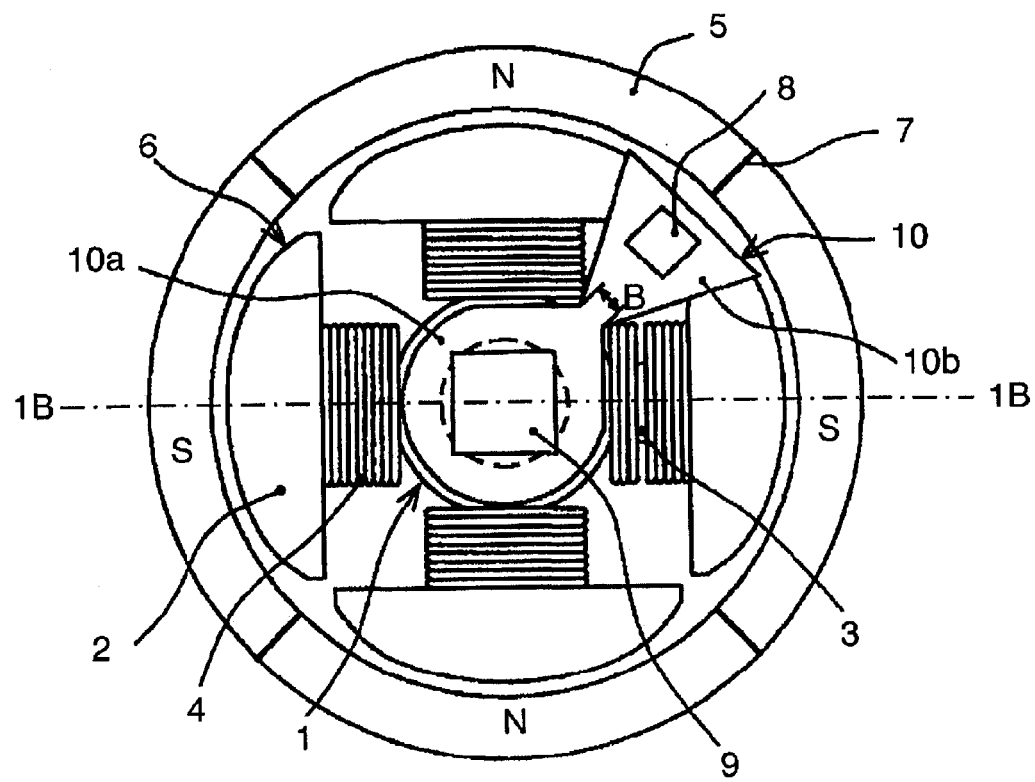
FIG. 1A shows a configuration of a brushless DC motor in accordance with exemplary embodiment 1 of the present invention.
Figure 1B:
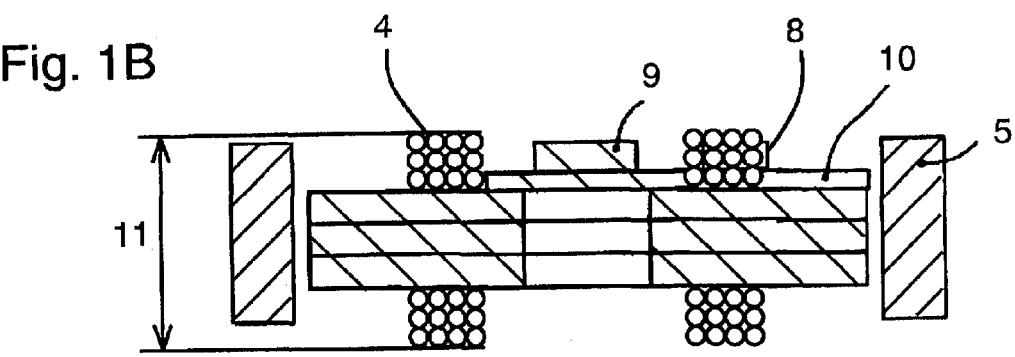
FIG. 1B is a section view at a line 1B—1B of the brushless DC motor shown in FIG. 1A.
Figure 2A:
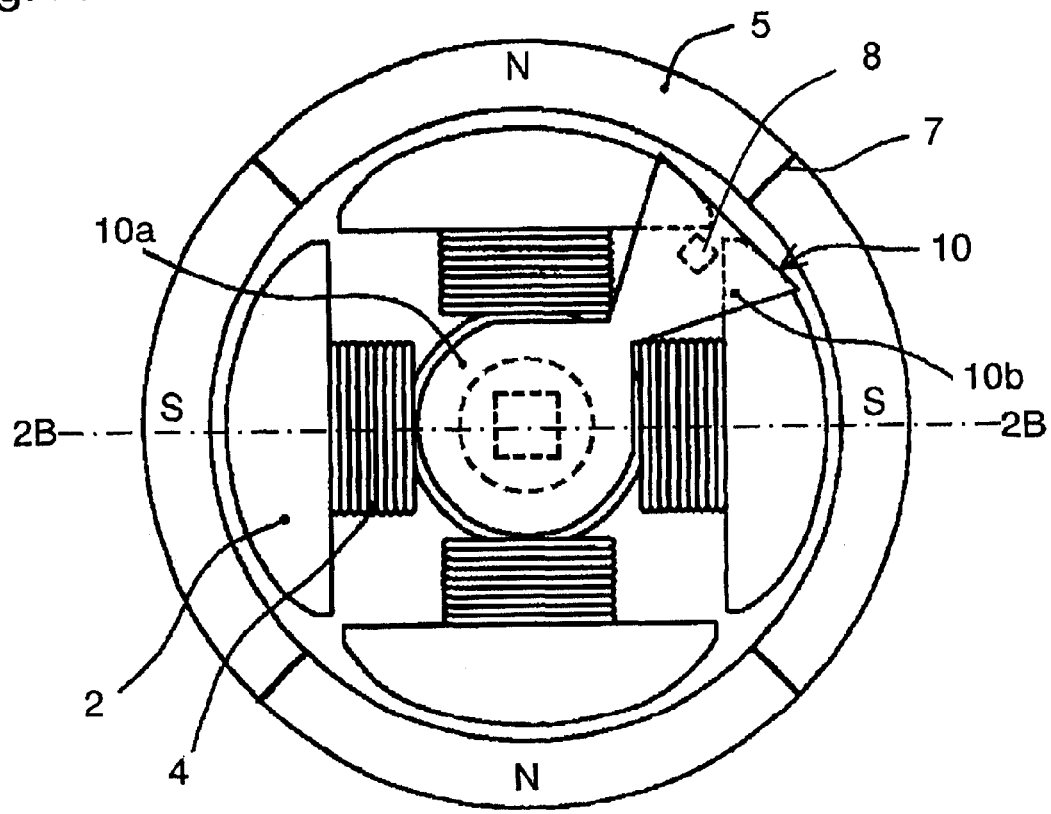
FIG. 2A is a configuration of another brushless DC motor in accordance with embodiment 1.
Figure 2B:
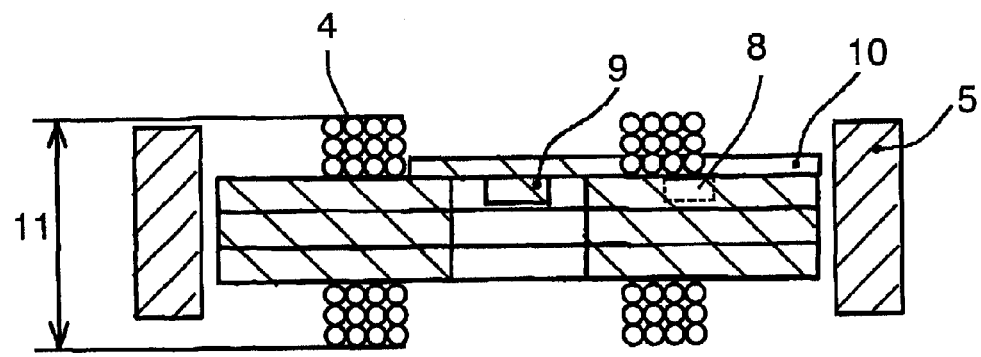
FIG. 2B is a section view at a line 2B—2B of the brushless DC motor shown in FIG. 2A.

FIG. 1A shows a configuration of a brushless DC motor according to exemplary embodiment 1 of the present invention. FIG. 1B is a section view of the brushless DC motor at line 1B—1B in FIG. 1A. FIG. 2A shows a configuration of another brushless DC motor according to embodiment 1, and FIG. 2B is a section view of the brushless DC motor at line 2B—2B.

As shown in FIGS. 1A and 1B, the motor of embodiment 1 includes stator core 1 attached to armature 6, salient poles 2 at respective tips of arms extending from stator core 1, teeth 3 which are the arms extending radially from the center of stator core 1, coils 4 wound around teeth 3, and magnet rotor 5. Armature 6 is connected with stator core 1 which includes salient poles 2 and teeth 3, and coils 4. Stator core 1 includes stacked plural silicon steel sheets which each have a thickness of about 0.2 to 0.5 mm and have high magnetic permeability to reduce core loss and improve motor efficiency. Coil 4 for generating a rotating magnetic field is formed by winding wire around teeth 3 of stator core 1. Wound material of coil 4 may be a copper wire having a thin insulating film coated on its surface. Stator core 1 has a hole formed at its center.

Each salient pole 2 opposing magnet rotor 5 is wider than each tooth 3 in order to accept magnetic flux from rotor 5 to stator core 1 and to secure a large portion on coil 4 for the wire wound. Permanent magnetic ferrite or metal magnetic substance, such as SmCo, is suitable for magnet rotor 5. Attraction and repulsion of the magnetic force generated by the current flowing in coil 4 of stator core 1 generates torque for magnet rotor 5 in its rotating direction. The torque rotates magnet rotor 5.

Transition point 7 of the magnetic pole corresponds to a position of a magnetic pole in magnet rotor 5. The motor includes magnetic pole position sensor 8 (such as a Hall element), driver IC 9, and substrate 10. Coil 4 has coil end-to-end length (i.e., height) 11. To generate the rotation torque efficiently at magnet rotor 5, it is necessary to switch the direction of the current flowing in coil 4 precisely in time. Magnetic pole position sensor 8 thus detects transition point 7 of the magnetic pole of magnet rotor 5 for generating a signal to determine a time the current is switched. The signal detected by sensor 8 is input to driver IC 9, and driver IC 9 switches the direction of the current flowing in coil 4 for switching a polarity of a magnetic pole of a solenoid magnet generated at each of four salient poles 2. Magnetic pole position sensor 8 and driver IC 9 are mounted on substrate 10.

In FIGS. 1A and 1B, driver IC 9 is larger than a diameter of the hole (shown by the dotted line) at the center of stator core 1, and is mounted to a side opposite to armature 6. Magnetic pole position sensor 8 is also mounted on substrate 10. However, the sum of the thickness of stator core 1 and the height of magnetic pole position sensor 8 or driver IC 9 may become larger than coil end length (height) 11, which determines the thickness of armature 6. The sum may determine the thickness of the motor and, thus, make the thickness of the motor slightly exceed the coil end length (height).

The brushless DC motor of embodiment 1 features the shape of substrate 10 and the layout of substrate 10 on armature 6. As shown in FIG. 1A, substrate 10 has a keyhole shape consisting of center substrate portion 10a and arm substrate portion 10b for the following reasons. Magnetic pole position sensor 8 needs to be positioned as close to magnet rotor 5 as possible for detecting a position of the magnetic pole (transition position 7 of the magnetic pole). In addition, driver IC 9 needs to be mounted at the center of stator core 1 since driver IC 9 requires a mounting area several times larger than sensor 8. Consequently, sensor 8 is mounted on arm substrate portion 10b, and driver IC 9 is mounted on center substrate portion 10a. In addition, since substrate 10 needs to be fixed to stator core 1 so as to avoid coil 4, the neck of arm substrate portion 10b has a width smaller than the minimum width B between adjacent coils 4.

Substrate 10 is thus mounted on stator core 1 such that arm substrate portion 10b is securely accommodated between two coils 4.

In embodiment 1, substrate 10 has a keyhole shape consisting of an approximately round center substrate portion 10a and trapezoid arm substrate portion 10b. However, the shape of center substrate portion 10a is not limited to a round shape. The shape may be a polygon, such as a rectangle, square, or hexagon, as long as center substrate portion 10a is accommodated in the area surrounded by four coils 4. The shape of arm substrate portion 10b is not limited to a trapezoidal shape. The shape may be rectangle, square, polygon, or fan shape, as long as arm substrate portion 10b has a neck having a width smaller than the minimum width B between coils 4 to be accommodated between coils 4, and as long as substrate portion 10b has a side to salient pole 2 mounted to stator core 1.

The thickness of the conventional motor is determined by the length calculated by adding the coil end-to-end length (height) 11, substrate thickness, and the height of mounted components (e.g., the driver IC and the magnetic pole position sensor). In embodiment 1, as described above, substrate 10 on which components, such as IC 9 and sensor 8, are mounted is disposed on armature 6. Therefore, the thickness of the motor is determined by the sum of the thickness of stator core 1, the thickness of substrate 10, the height of a mounted component, and a lower portion of the coil height 11, or by the total coil end-to-end length (height) 11. This allows the motor to be thin. For example, a motor of supply voltage of 5V and motor output of 200 mW including stator core 1 with 20 mm outer diameter had a thickness of 4 mm. A conventional motor of the same specification had a thickness of 7.5 mm. Therefore, the motor has a thickness reduced to almost half. According to embodiment 1, an extremely thin motor is obtainable.

As shown in FIG. 2B, magnetic pole position sensor 8 and driver IC 9 may be mounted on a surface of substrate 10 where armature 6 is disposed (i.e., a surface closest to armature 6). This layout is effective particularly when driver IC 9 is small and has a small output. In this layout, the thickness of the motor is determined only by. coil end-to-end length 11, thus providing a thin brushless DC motor.

Exemplary Embodiment 2

Figure 3A:
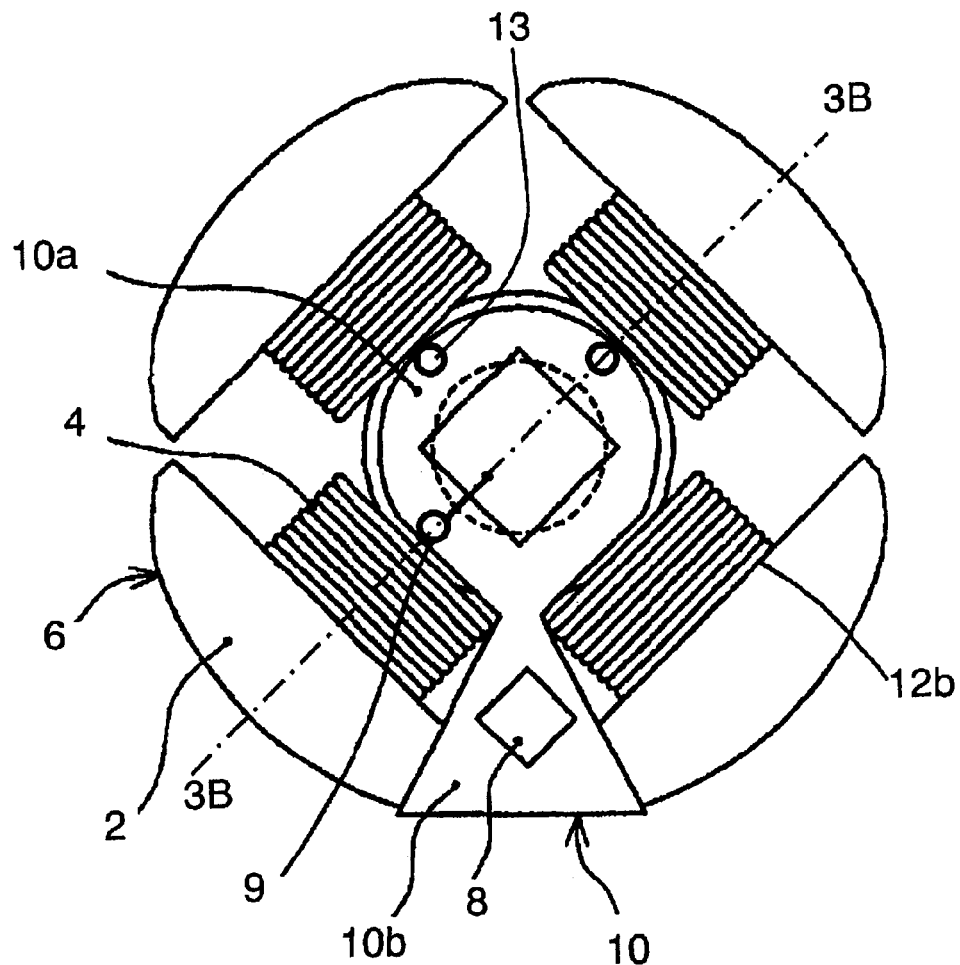
FIG. 3A shows a stator core and a substrate in a brushless DC motor in accordance with exemplary embodiment 2 of the invention.
Figure 3B:
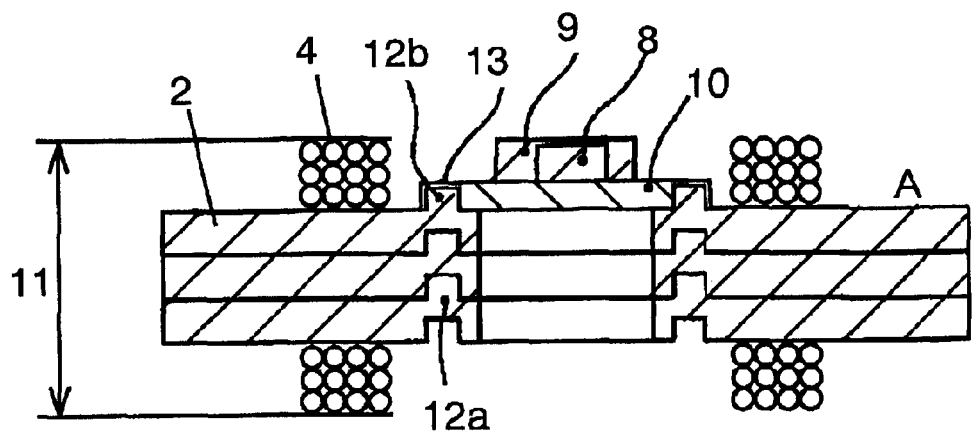
FIG. 3B is a section view at a line 3B—3B of a stator core and a substrate of the brushless DC motor shown in FIG. 3A.

FIG. 3A shows a stator core and a substrate of a brushless DC motor according to exemplary embodiment 2 of the present invention. FIG. 3B is a section view of the stator core and the substrate at line 3B—3B in FIG. 3A. The descriptions for elements denoted by the same reference numerals as in embodiment 1 are omitted.

As shown in FIGS. 3A and 3B, a positioning protrusion is provided on each laminated steel sheet of stator core 1 for preventing them from separation. The positioning protrusion also functions as a caulking portion for fixing steel sheets to each other. Three protrusions 12a are provided on each of the steel sheets as the positioning, protrusion. Steel sheets are stacked and pressed by a press machine, and the protrusions 12a are caulked to form an integrated stator core 1.

The stator core of a conventional motor has no protrusion on a top steel sheet for having its top face be flat. Alternatively, a round hole is created on the top steel sheet for inserting the protrusion on the steel sheet just beneath the top steel sheet for correctly positioning both the steel sheets. The sheet of embodiment 2 has three protrusions 12b identical to protrusions 12a on the top face (side A), and notches 13 corresponding to protrusions 12b are provided in substrate 10. Substrate 10 is positioned and secured with each projection 12b fitted into a notch 13. In embodiment 2, each steel sheet has three protrusions 12b, and substrate 10 has three notches 13. The sheet may have a single protrusion, and the substrate may have a single notch. Plural protrusions and notches allow the sheets and the substrate to be positioned accurately. Notches 13 in substrate 10 may be shaped like holes.

In the conventional brushless DC motor, substrate 10 is secured by inserting and then by soldering a pin on armature 6. Since this allows the pin to be positioned inaccurately, the position of the pin may deviate by 2.5° (physical angle) or more in the rotating direction, and the deviation causes a 5% deviation in the motor output. According to embodiment 2, substrate 10 is positioned with protrusions 12a and 12b and notch 13. This limits the positional deviation in the rotating direction to within 1° (physical angle). This deviation corresponds to within an electrical angle of 2° for the four-pole brushless DC motor shown in FIGS. 3A and 3B. Accordingly, the motor output is stabilized to within 1% deviation.

Exemplary Embodiment 3

Figure 4:
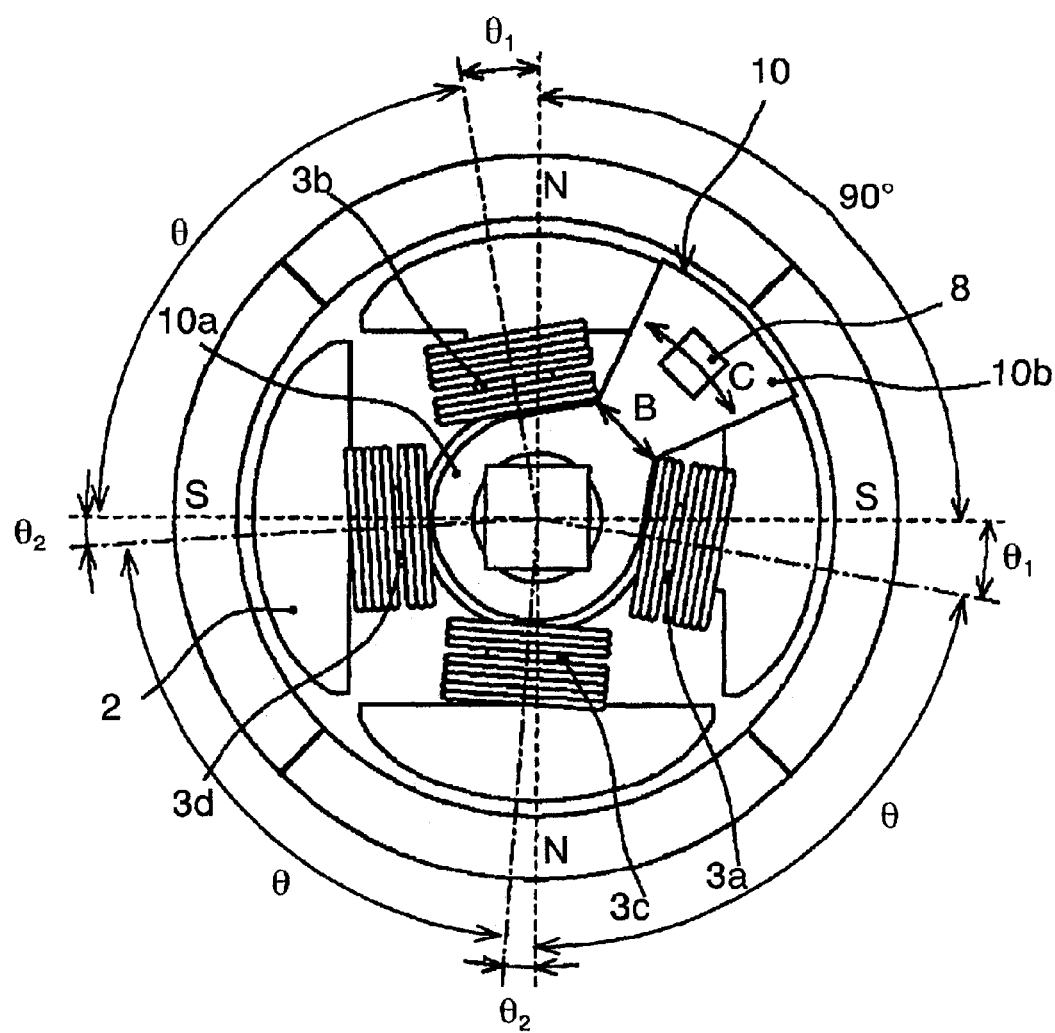
FIG. 4 shows an armature of a brushless DC motor in accordance with exemplary embodiment 3 of the invention.

FIG. 4 shows an armature of a brushless DC motor according to exemplary embodiment 3 of the present invention.

The conventional brushless DC motor has teeth 3 disposed at the center of salient poles 2. According to embodiment 3, two adjacent teeth 3a and 3b between which substrate 10 is inserted are not connected at the center of salient poles 2, but at a position an angle $\theta_1$ away from each other. In other words, tooth 3a is disposed at a position with angle $\theta_1$ delayed compared to an equal pitch angle, and tooth 3b is disposed at a position with angle $\theta_1$ advanced, thus widening the angle between adjacent teeth 3a and 3b. This secures a sufficient width of portion B, the minimum width of substrate 10, for improving the strength of this portion. In addition, mountable width C, which indicates flexibility of the layout position of magnetic pole position sensor 8, is sufficiently widened to about 20°, compared to 2° to 3° (physical angle) in the conventional motor. Accordingly, a forwarding angle of magnetic pole position sensor 8 is adjustable to an optimum angle for improving the motor efficiency by 2%.

In FIG. 4, teeth 3c and 3d are shifted from the centers of the salient poles by angle $\theta_2$. In other words, their pitch angle is narrowed by angle $\theta_2$ compared to the case that all teeth are disposed at an equal pitch angle. If teeth 3a, 3b, 3c, and 3d are not shifted, the distance between teeth 3a and 3c becomes shorter, and the distance between teeth 3b and 3d becomes shorter. This results in a lower space factor for the winding. This reduces the motor efficiency. According to embodiment 3, the space factor is prevented from lowering by changing the distance between teeth 3a and 3b and distance between teeth 3c and 3d by angle $\theta_1$ and angle $\theta_2$, respectively. In the four-slot motor as shown in FIG. 4, angle $\theta_2$ is preferably set to about $\theta_2=\theta_1/3$. Since angle $\theta_2$ changes fork each tooth generally in an n-slot motor, an angle $\theta$ between teeth other than the teeth shifted by $\theta_1$ is preferably set to about:

$\theta=(360/n)-2\theta_1/(n-1)$.

Exemplary Embodiment 4

Figure 5A:
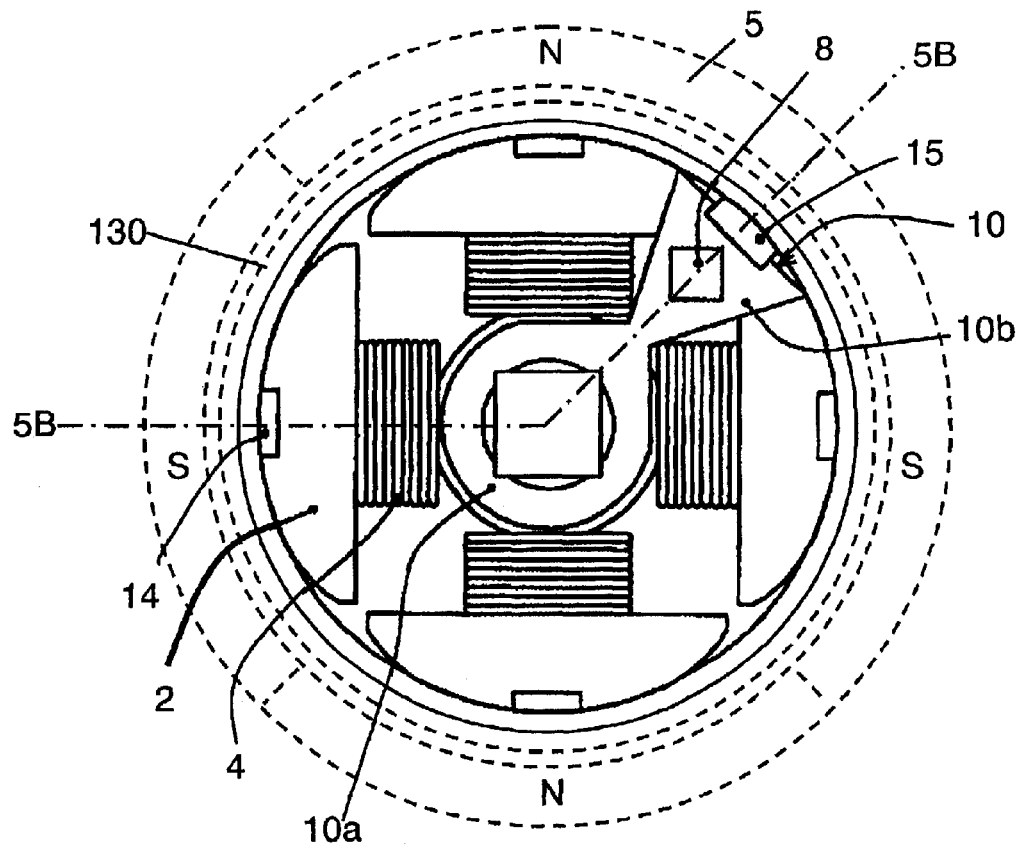
FIGS. 5A and 5B show a configuration of a brushless DC motor used as a sealless pump motor in accordance with exemplary embodiment 4 of the invention.
Figure 5B:
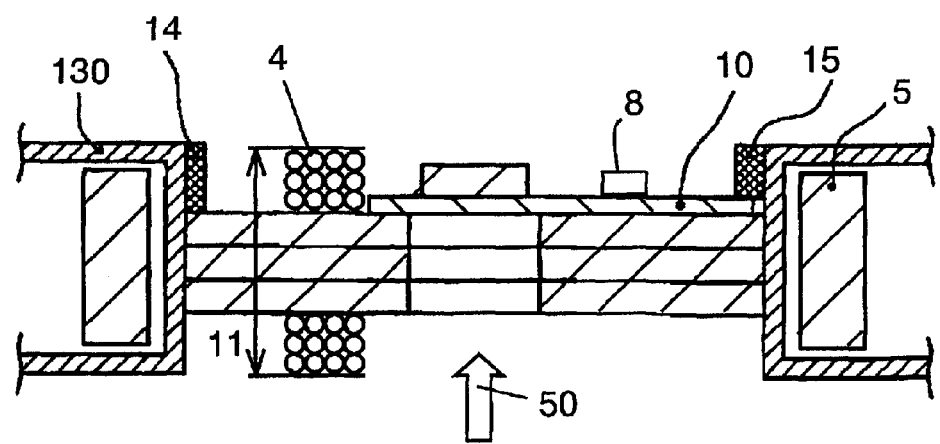

FIGS. 5A and 5B show a motor for a sealless pump according to exemplary embodiment 4. The pump includes the brushless DC motor according to embodiment In FIGS. 5A and 5B, a separator 130 separates a pumping unit, which forms a sealless pump, for feeding liquid from an electrical unit for driving the unit. In other words, separator 130 separates armature 6 and mounted components on substrate 10 from rotor 5. An ordinary pump needs a shaft seal, but the sealless pumps include separator 130 sealing the entire electrical unit. According to embodiment 4, armature 6 is fixed by press-fitting separator 130 while the inner circumference of separator 130 and outer circumference of salient pole 2 contact to each other. Core press-fit stopper 14 integrated with separator 130 contacts a top face of salient pole 2 when armature 6 is press-fitted to separator 130 from the bottom of the pump in direction 50 as shown in FIG. 5B to determine a position of press-fitted armature 6. Substrate-fixing stopper 15 determines a position of the press-fitted substrate 10 through contacting the top face of substrate 10. Upon being press-fitted, substrate 10 is precisely secured by substrate-fixing stopper 15 disposed above the core press-fit stopper 14 for the substrate thickness, and salient pole 2. This reduces the number of steps in assembling the motor. Moreover, this prevents the position of armature 6 press-fitted and secured from deviation, thus reducing vibration and noise which may occur due to the deviation.

Exemplary Embodiment 5

Figure 6A:
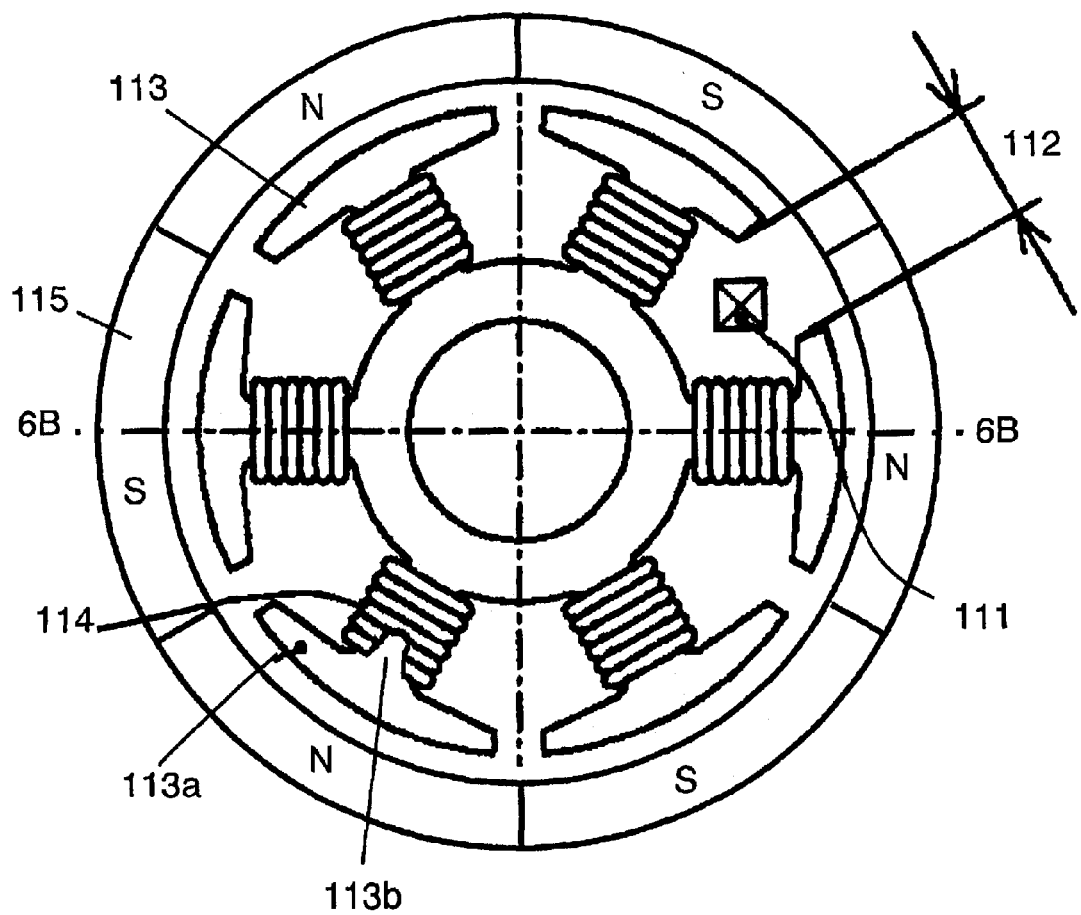
FIGS. 6A and 6B show a brushless DC motor in accordance with exemplary embodiment 5 of the invention
Figure 6B:
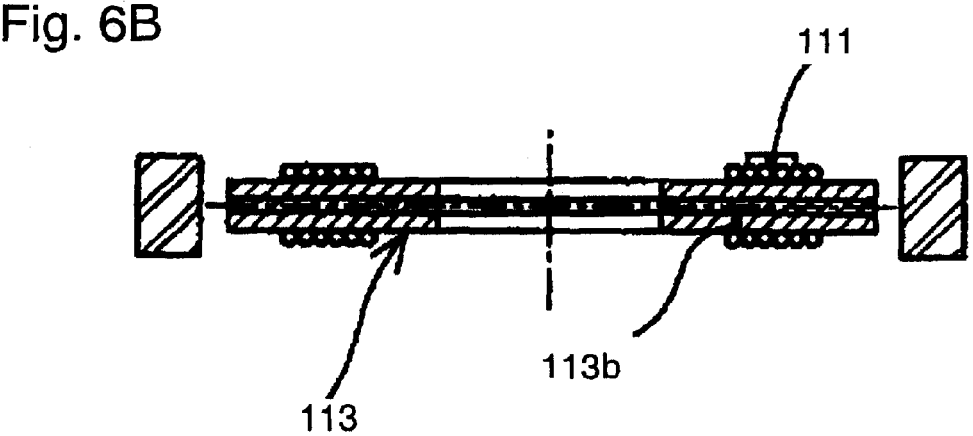
Figure 7A:
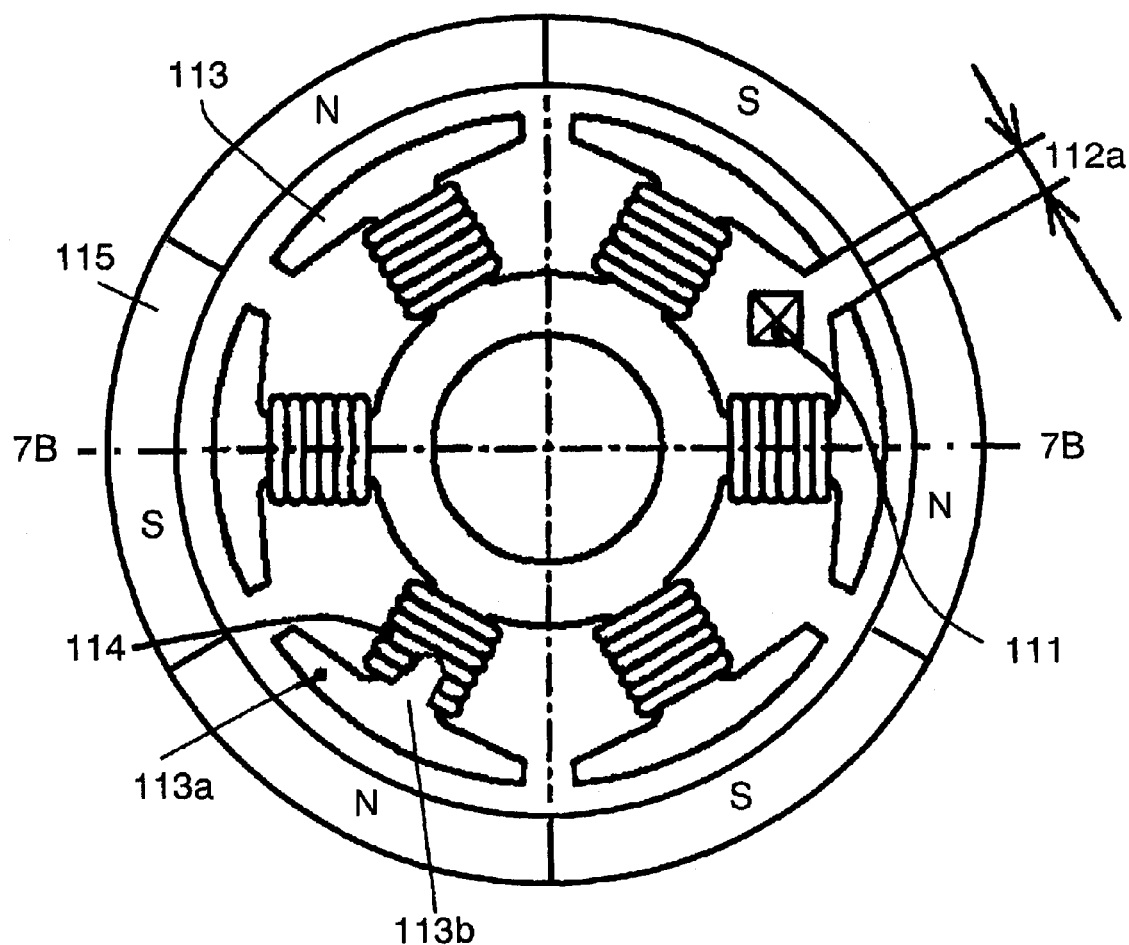
FIGS. 7A and 7B show another brushless DC motor in accordance with embodiment 5.
Figure 7B:
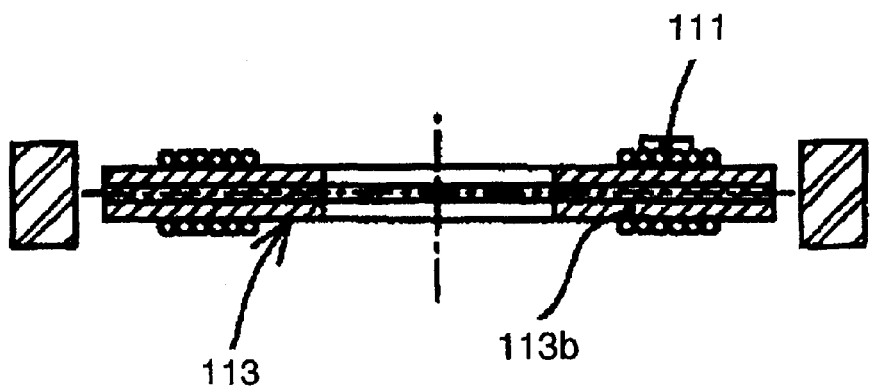

FIGS. 6A and 6B show an armature of a brushless DC motor according to exemplary embodiment 5 of the present invention. FIGS. 7A and 7B show another brushless DC motor according to embodiment 5.

In FIGS. 6A and 6B, salient poles 113a (described later) of stator core 113 between which magnetic pole position sensor 111, such as a Hall element, is are spaced apart at salient pole distance 112. Stator core 113 includes plural steel sheets. Teeth 113b are provided on stator core 113 and have salient poles 113a at respective tips. Coil 114 is wound around each tooth 113b. Magnet rotor 115 has plural magnetic poles disposed on its circumference. Salient poles 113a face the magnets of magnet rotor 115 with a small gap between them. Salient pole distance 112 of an area where magnetic pole position sensor 111 is provided is larger than the salient pole distance between salient poles 113a of an area where magnetic pole position sensor 111 is not disposed, as shown in FIG. 6A.

FIGS. 7A and 7B show another brushless DC motor for comparison with the brushless DC motor according to embodiment 5. In another motor, salient pole distance 112a of an area where magnetic pole position sensor 111 is disposed and the salient pole distance between the other adjacent salient poles 113a are all the same.

The brushless DC motor according to embodiment 5 has stator core 113, and magnet rotor 115 rotates due to a current in coil 114. Magnetic pole position sensor 111 detects a position of the magnetic pole of magnet rotor 115, and controls a phase of the current.

The brushless DC motor according to embodiment 5 has the salient pole distance 112 larger than the other salient pole distances. This increases flux intensity between magnet poles passing magnetic pole position sensor 111, such as a Hall element, disposed between salient poles 113a, thus increasing the average output voltage induced at magnetic pole position sensor 111. Table 1 shows salient pole distances and measurements of average output voltage from magnetic pole position sensor 111. Greater average output voltage demonstrates higher performance for detecting the magnetic pole.

TABLE 1

|  | Salient pole distance | Average output voltage |
|---|---|---|
| Measurement 1 | All 1.5 mm | 8 mV |
| Measurement 2 | One: 2.5 mm, Others: 1.5 mm | 17 mV |
| Measurement 3 | One: 2.5 mm, Others: 1.5 mm | 40 mV |
| Measurement 4 | All 1.5 mm | 23 mV |
| Measurement 5 | One: 2.5 mm, Others: 1.5 mm | 45 mV |
| Measurement 6 | All 1.5 mm | 31 mV |

Measurement 1 is of another brushless DC motor shown in FIGS. 7A and 7B, which has an equal distance between all salient poles. Measurement 2 is of the brushless DC motor according to embodiment 5, which has salient pole distance 112a larger than other salient pole distances.

Average output voltages in Table 1 are measured with the HW-108A Hall sensor (Asahi Kasei Corporation).

In Measurement 1, the average output voltage is 8 mV, and the salient pole distance 112a is 1.5 mm. In Measurement 2, the average output voltage is 17 mV, salient pole distance 112 is 2.5 mm, and other salient pole distances are 1.5 mm.

These results show that the brushless DC motor according to embodiment 5 is improved in magnetic pole position detection performance since the salient pole distance 112 is larger than other salient pole distances. In addition, the motor does not require the gap for the substrate, thus enabling the motor to be thinner. Furthermore, the performance of the motor does not degrade since only one salient pole distance differs from the others.

The brushless DC motor according to embodiment 5 is thus thin. Therefore, upon this thin motor being installed in a pump, a small pump having good magnetic pole position detection and stable motor performance is provided. Similarly, upon this motor being installed in a cooling fan for an electronic apparatus, such as a personal computer, or in a circulating pump for cooling systems using refrigerant, a smaller electronic apparatus is provided.

Exemplary Embodiment 6

Figure 8A:
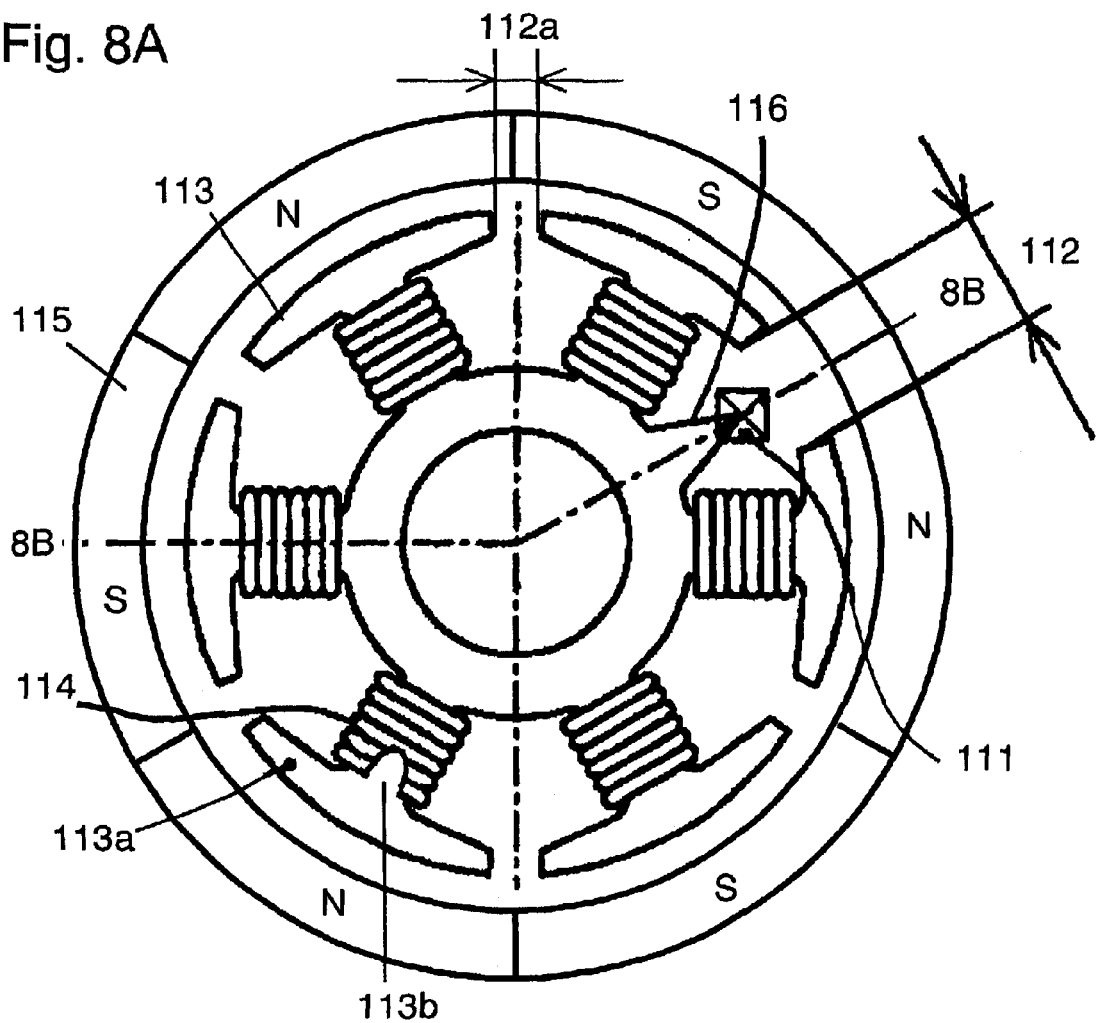
FIGS. 8A and 8B show a stator core of a brushless DC motor in accordance with exemplary embodiment 6 of the invention.
Figure 8B:
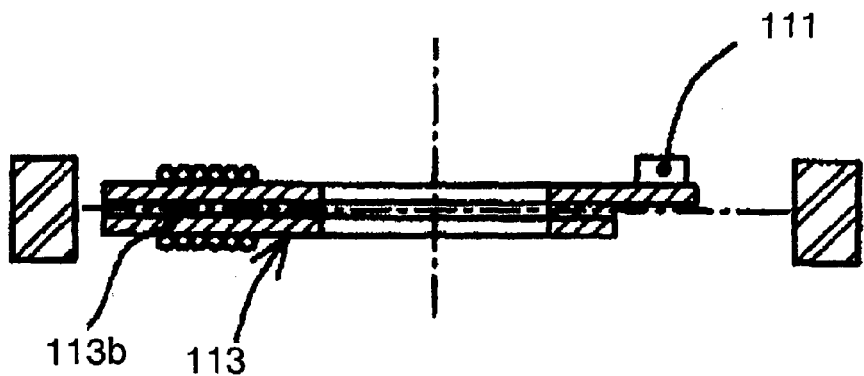
Figure 9A:
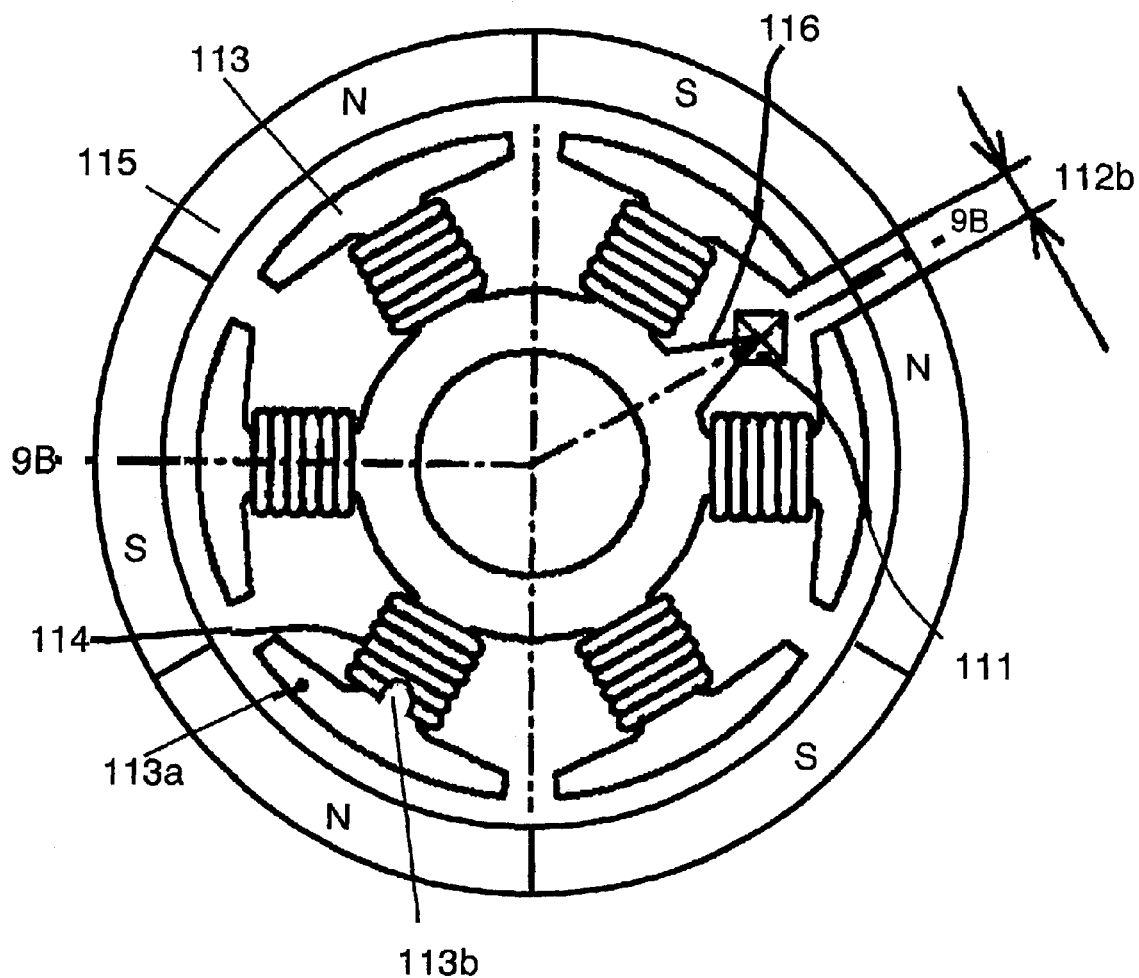
FIGS. 9A and 9B show a stator core of another brushless DC motor in, accordance with embodiment 6.
Figure 9B:
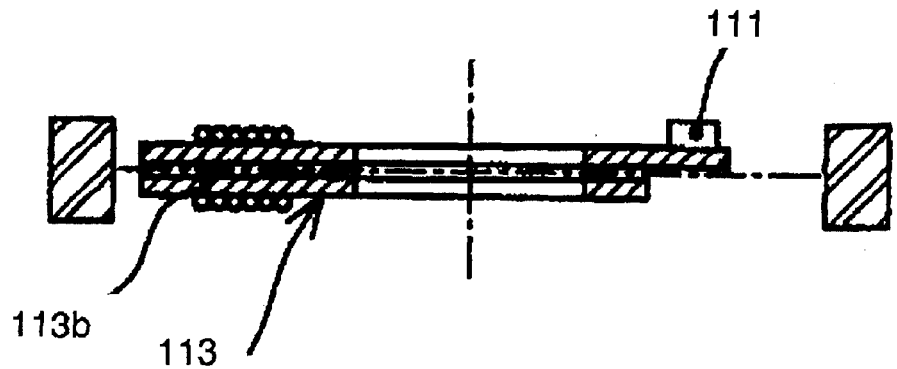

FIGS. 8A and 8B show a brushless DC motor according to exemplary embodiment 6 of the present invention. FIGS. 9A and 9B show another brushless DC motor. Elements which are basically the same as those in embodiment 5 are denoted by the same reference numerals.

In FIGS. 8A and 8B, the motor according to embodiment 6 includes stator core 113, coils 114, and magnet rotor 115. Stator core 113 includes salient poles 113a spaced apart salient pole distance 112 at an area where magnetic pole position sensor 111 is provided, and teeth 113b. Triangular protrusion 116 is formed on a certain steel sheet of stator core 113 between teeth 113b between which magnetic pole position sensor 111 is disposed. Protrusion 116 has a sharp triangular shape. FIG. 8B is a section view of the motor at line 8B—8B in FIG. 8A. As shown in FIG. 8B, steel sheets without protrusion 116 are laminated in stator core 113, and a steel sheet with protrusion 116 is provided at the outermost layer. Magnetic pole position sensor 111 is disposed at the tip of protrusion 116. However, protrusion 116 may be preferably provided on one or more steel sheets, not only at the outermost position where magnetic pole sensor 111 is disposed. Salient pole distance 112 at an area where magnetic pole position sensor 111 is provided is larger than salient pole distance 112a between salient poles 113a on which magnetic pole position sensor 111 is not disposed, as shown in FIG. 8A. As in embodiment 5, a larger salient pole distance increases the average output voltage of magnetic pole position sensor 111.

FIGS. 9A and 9B show another brushless DC motor having equal salient pole distances according to embodiment 6. In FIG. 9B, salient pole distance 112b at an area where magnetic pole position sensor 111 is provided is equal to all other distances between salient poles 113a.

The brushless DC motor according to embodiment 6 has triangular protrusion 116 between teeth 113b of stator core 113, so that magnetic flux can concentrate at protrusion 116. Accordingly, magnetic flux passing through magnetic pole position sensor 111 becomes greater, and thus induces a larger average output voltage. Measurement 3 in Table 1 is the measurement of the motor according to embodiment 6. Measurement 4 is the measurement of another motor which has an equal distance between all salient poles.

In Measurement 3, the average output voltage is 40 mV, salient pole distance 112 is 2.5 mm, and salient pole distance 112a is 1.5 mm. In Measurement 4, the average output voltage is 23 mV, and salient pole distance 112b is all 1.5 mm.

These measurements show that the brushless DC motor of embodiment 6 is improved in magnetic pole position detecting performance by triangular protrusion 116 between teeth 113b of stator core 113. In addition, the motor can be thinner since a gap, which is needed for the conventional motor, for the substrate is not necessary. If the salient pole distance 112 where the magnetic pole position sensor 111 is provided is larger than salient pole distance 112a between other salient poles 113a, the average output voltage of magnetic pole position sensor 111 further increases due to the larger salient pole distance, similarly to embodiment 5.

The brushless DC motor of embodiment 6 is thus thin. Upon this thin motor being installed in a pump, a small pump having good magnetic pole position detection and stable motor performance is provided. Similarly, upon this motor being installed in a cooling fan of an electronic apparatus, such as a personal computer, or in a circulating pump for cooling systems using refrigerant, a smaller electronic apparatus is provided.

Exemplary Embodiment 7

Figure 10A:
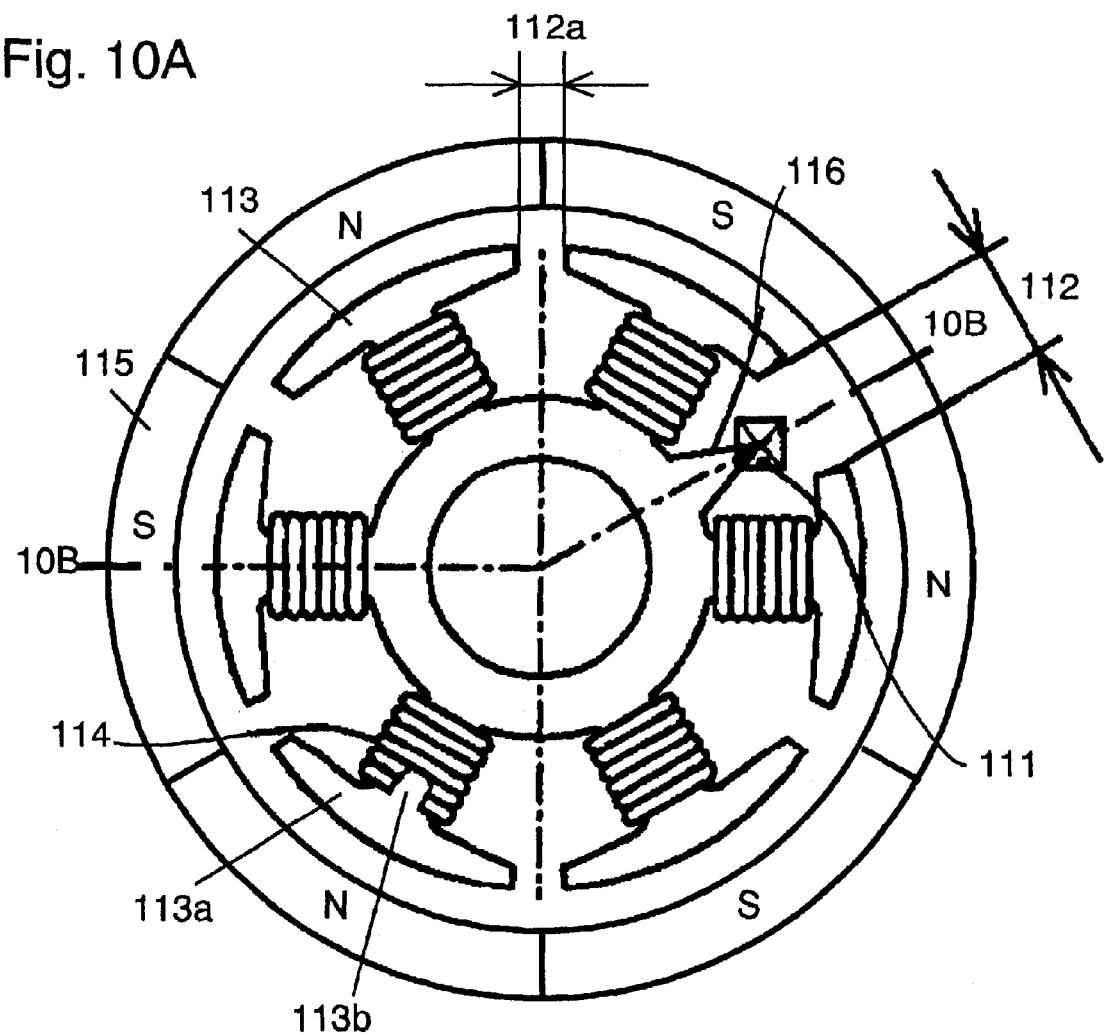
FIGS. 10A and 10B show a stator core of a brushless DC motor in accordance with exemplary embodiment 7 of the invention.
Figure 10B:
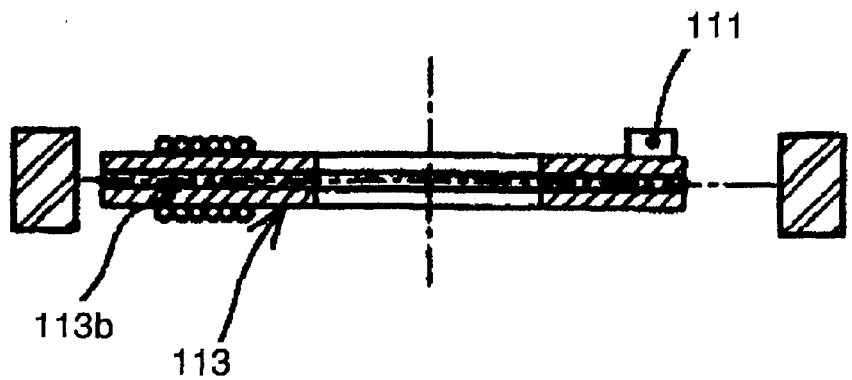
Figure 11A:
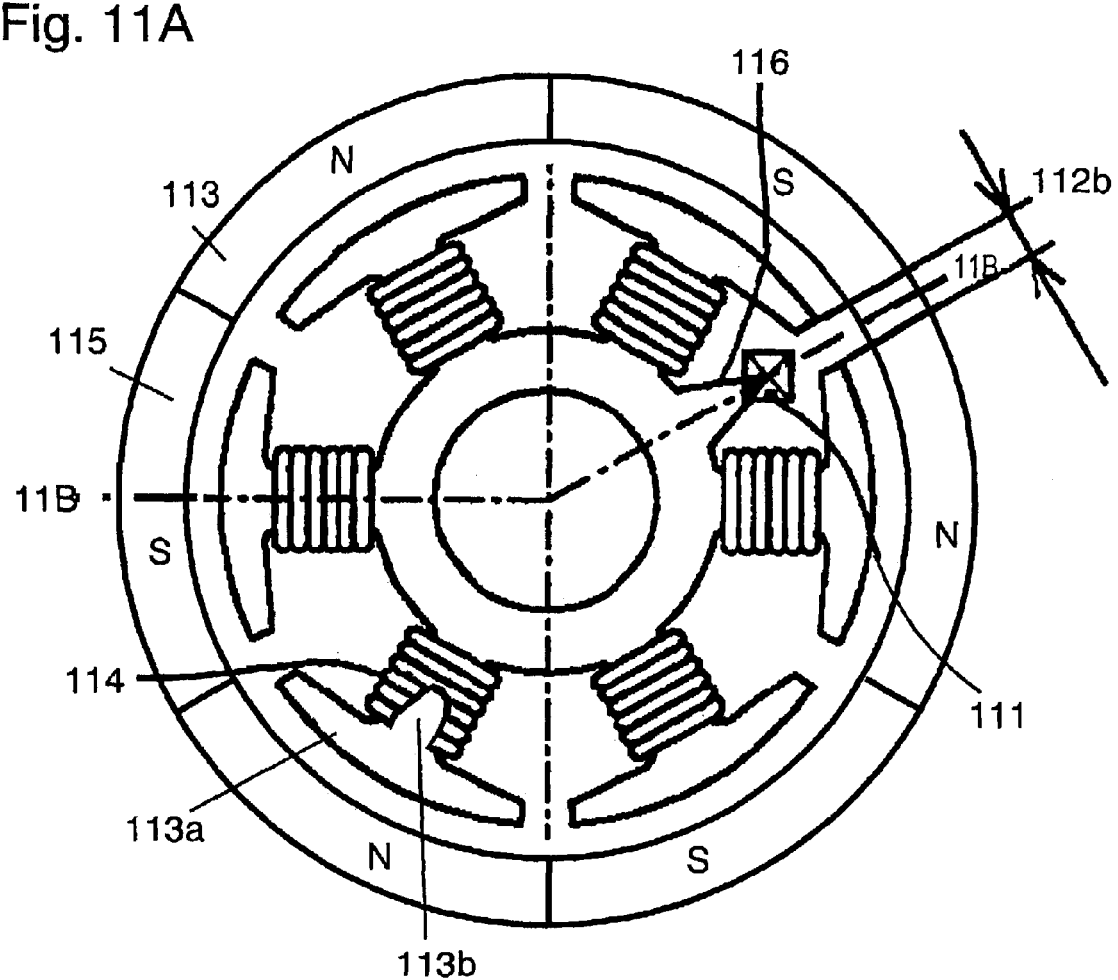
FIGS. 11A and 11B show a stator core of another brushless DC motor in accordance with embodiment 7.
Figure 11B:
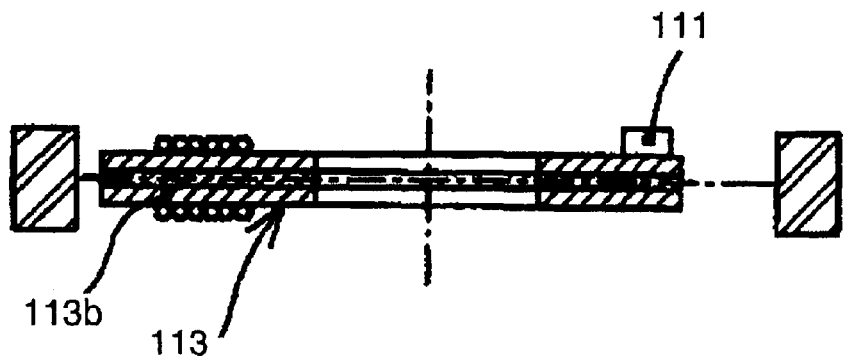

FIGS. 10A and 10B show a brushless DC motor according to exemplary embodiment 7 of the present invention. FIGS. 11A and 11B show a salient pole distance of another brushless DC motor. Elements which are basically the same as those in embodiments 5 and 6 are denoted by the same reference numerals.

As apparent from FIGS. 10A to 11B, each steel sheet laminated in stator core 113 has a protrusion 116. This allows magnetic flux to concentrate at the triangular protrusion 116 of each steel sheet, so that the density of magnetic flux passing through magnetic pole position sensor 111 increases, thus increasing an average output voltage induced to sensor 111.

The brushless DC motor of embodiment 7 is thus thin. Upon this thin motor being installed in a pump, a small pump having good magnetic pole position detection and stable motor performance is provided. Similarly, upon this motor being installed in a cooling fan of an electronic apparatus, such as a personal computer, or in a circulating pump for cooling systems using refrigerant, a smaller electronic apparatus is provided.

Exemplary Embodiment 8

Figure 12A:
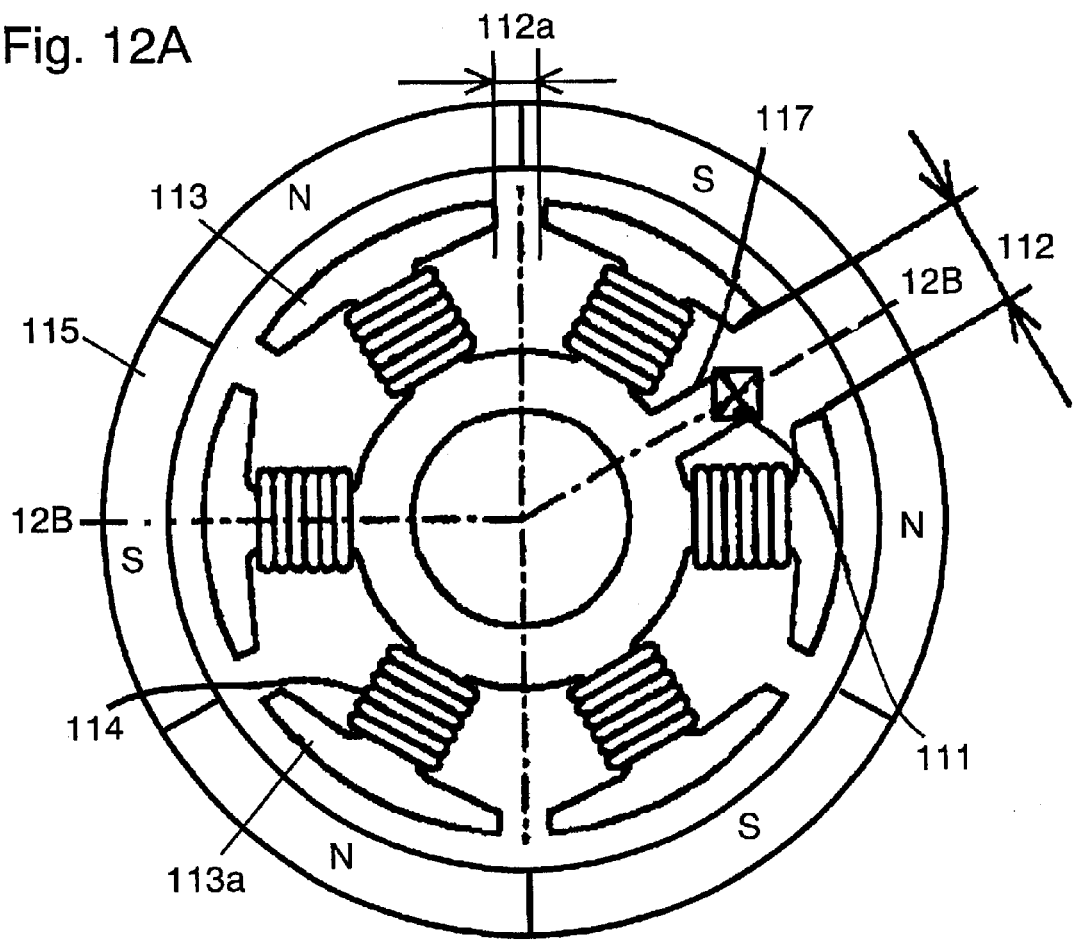
FIGS. 12A and 12B show a stator tore of a brushless DC motor in accordance with exemplary embodiment 8 of the invention.
Figure 12B:
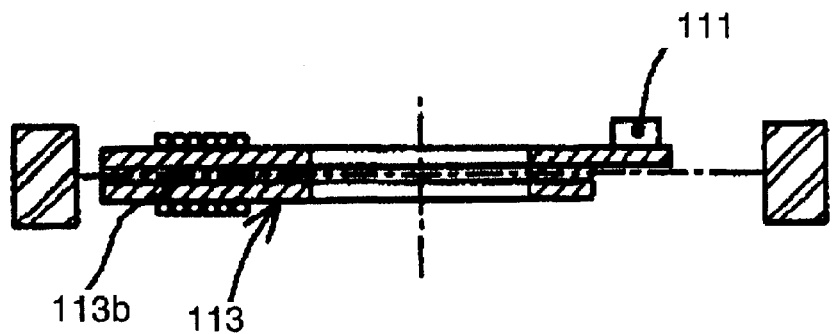

FIGS. 12A and 12B show a brushless DC motor according to exemplary embodiment 8 of the present invention. FIGS.

13A and 13B show another brushless DC motor. Elements which are basically the same as those in embodiments 5, 6, and 7 are denoted by the same reference numerals, and thus, are not described.

Figure 13A:
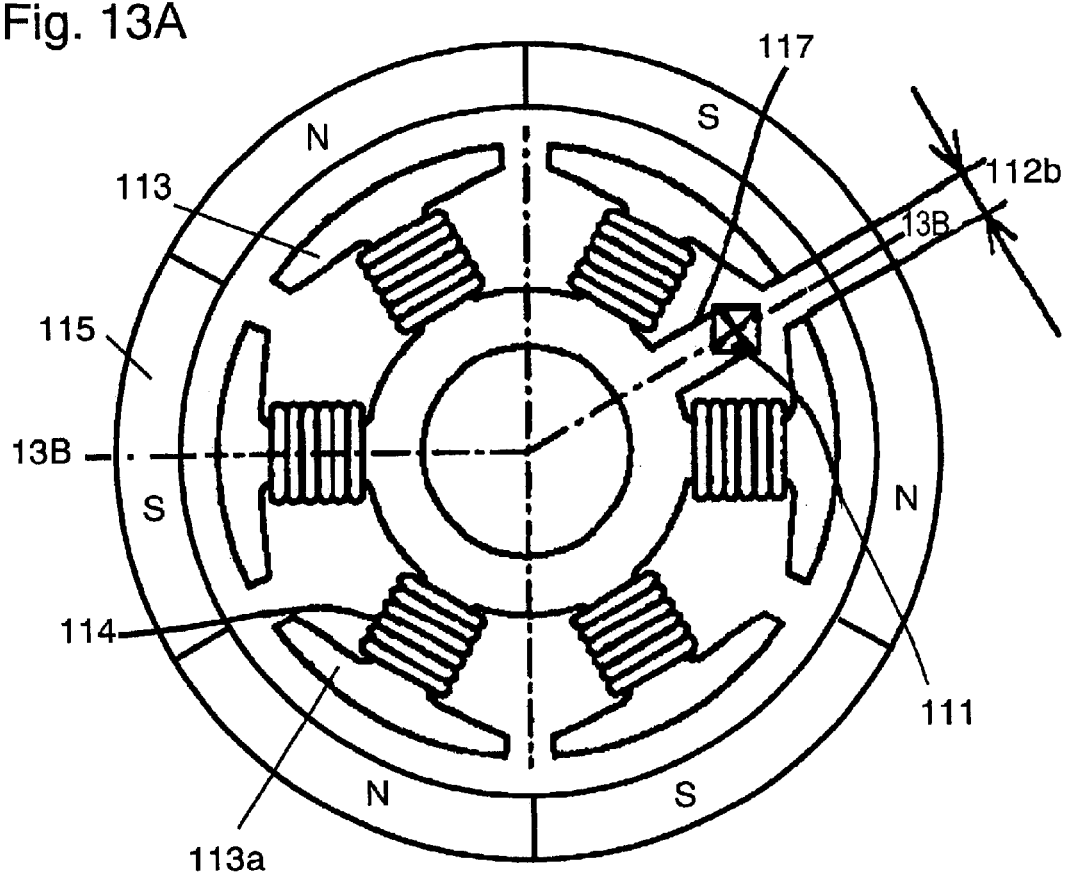
FIGS. 13A and 13B show a stator core of another brushless DC motor in accordance with embodiment 8.
Figure 13B:
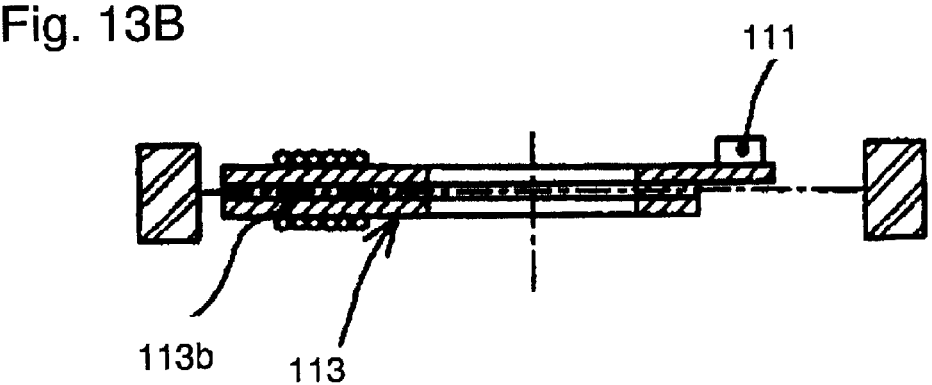

In FIGS. 12A and 12B, the motor of embodiment 8 includes magnetic pole position sensor 111, stator core 113, coil 114, and magnet rotor 115. Stator core 113 includes salient poles 113a and a salient pole distance 112 at an area where magnetic pole position sensor 111 is provided, and teeth 113b. Stator core 113 has rectangular protrusion 117 provided between a pair of teeth 113b. Magnetic pole position sensor 111 is mounted on the tip of rectangular protrusion 117. FIG. 12B, a section view of the motor at line 12B—12B in FIG. 12A, shows that steel sheets without protrusion 117 are laminated, and a steel sheet having protrusion 117 is provided at the outermost layer. Magnetic pole position sensor 111 is disposed at a tip of protrusion 117. However, protrusion 117 may be preferably provided at one or more steel sheet, not only at the outermost sheet, where magnetic pole sensor 111 is provided. Salient pole distance 112 of an area where magnetic pole position sensor 111 is provided is larger than salient pole distance 112a between salient poles 113a at which magnetic pole position sensor 111 is not provided. Similarly to embodiment 5, a larger salient pole distance increases the average output voltage of magnetic pole position sensor 111. The motor shown in FIG. 13A has an equal salient pole distance 112b between all salient poles 113a.

The brushless DC motor of embodiment 8 has rectangular protrusion 117 between teeth 113b of stator core 113, so that magnetic flux can concentrate at rectangular protrusion 117. This allows magnetic flux passing through magnetic pole position sensor 111 to be greater, and thus increases an induced average output voltage. Measurement 5 in Table 1 shows a measurement of the motor of embodiment 8 having salient pole distance 112. Measurement 6 shows a measurement of another motor which has equal salient pole distance 112b between all salient poles 113a.

In Measurement 5, the average output voltage is 45 mV, salient pole distance 112 is 2.5 mm, and salient pole distance 112a is 1.5 mm. In Measurement 6, the average output voltage is 31 mV, salient pole distance 112b is 1.5 mm.

As apparent from these measurements, the brushless DC motor of embodiment 8 is improved in magnetic pole position detecting performance, and can be thinner with rectangular protrusion 117 between teeth 113b of stator core 113. If the salient pole distance 112 where the magnetic pole position sensor 111 is disposed is larger than salient pole distance 112a between the other salient poles 113a, the average output voltage of magnetic pole position sensor 111 is further increased due to the larger salient pole distance, similarly to embodiment 5.

The brushless DC motor of embodiment 8 is thus thin. Upon this thin motor being installed in a pump, a small pump having good magnetic pole position detection, and stable motor performance is provided. Similarly, upon this motor being installed in, a cooling fan of an electronic apparatus, such as a personal computer, or in a circulating pump for cooling systems using refrigerant, a smaller electronic apparatus is provided.

Exemplary Embodiment 9

Figure 14A:
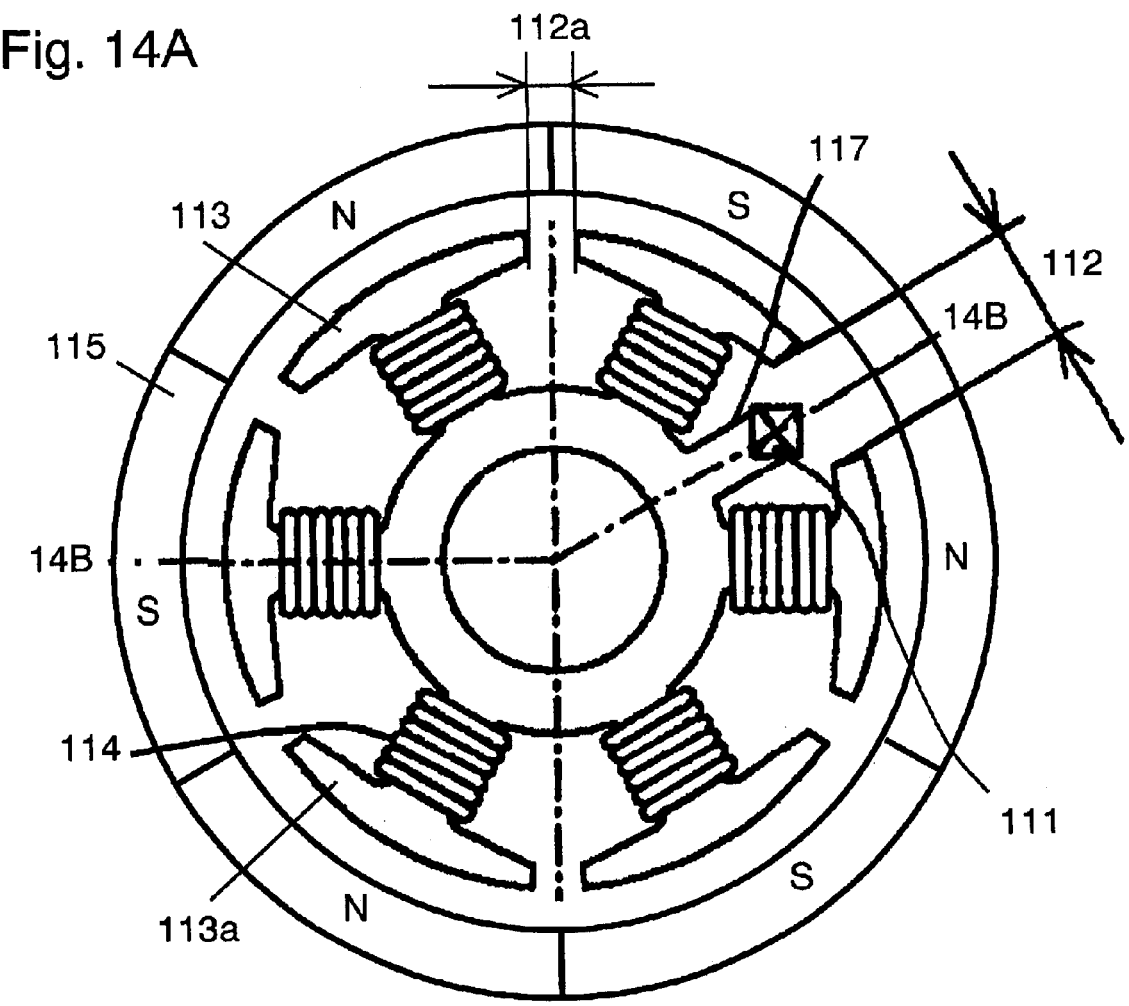
FIGS. 14A and 14B show a stator core of a brushless DC motor in accordance with exemplary embodiment 9 of the invention.
Figure 14B:
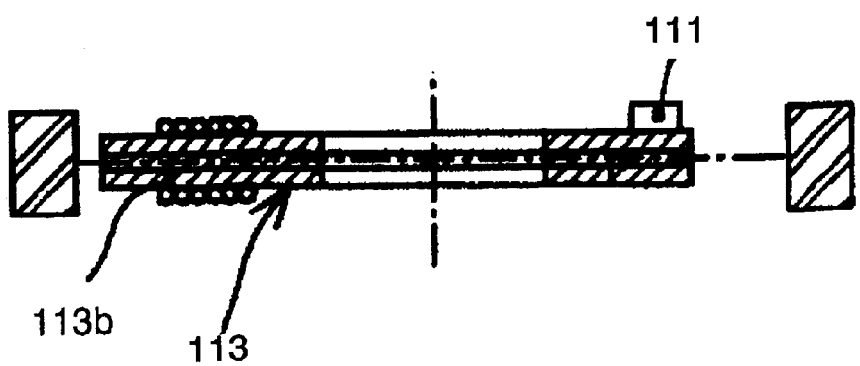
Figure 15A:
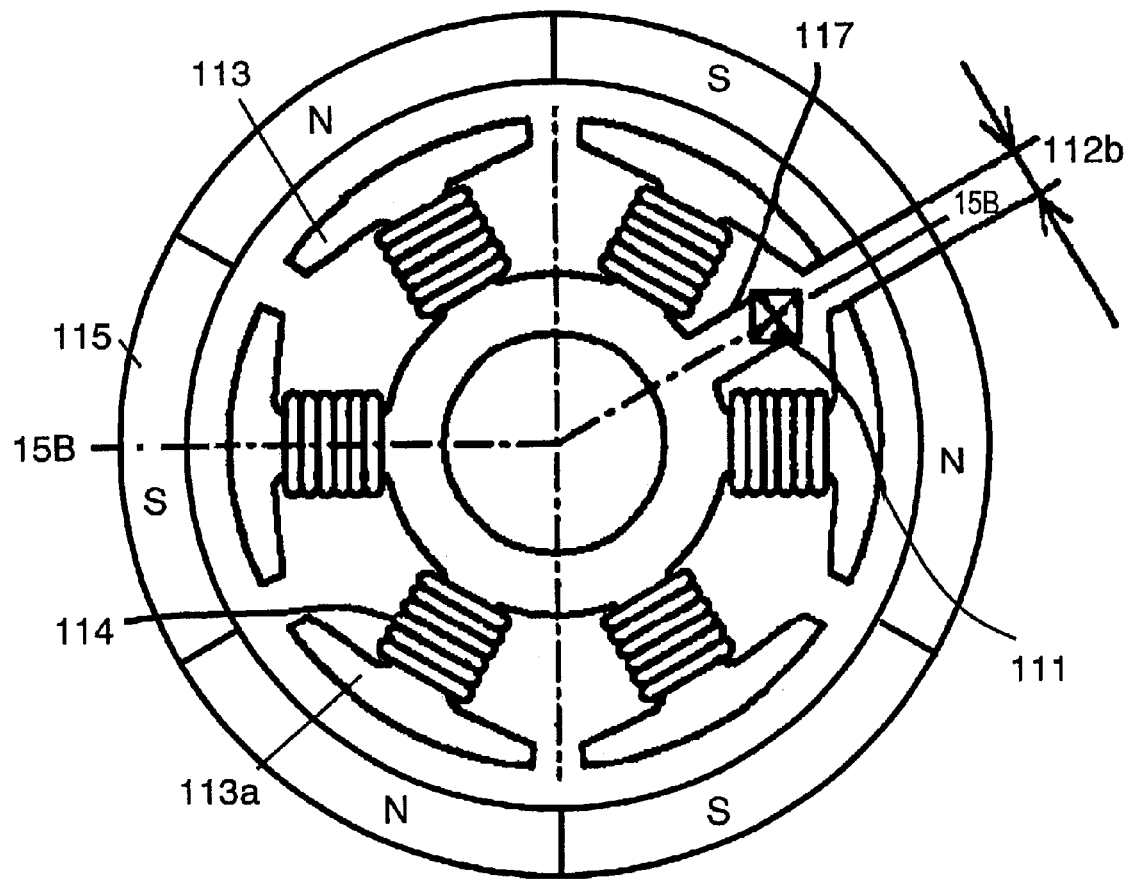
FIGS. 15A and 15B show a stator core of another brushless DC motor in accordance with embodiment 9.
Figure 15B:
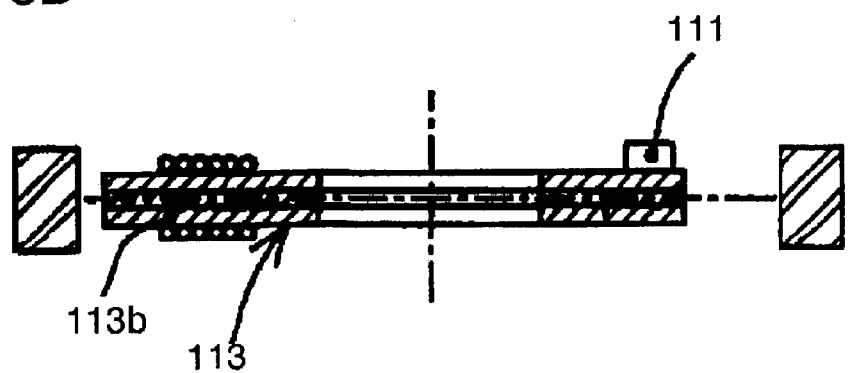

FIGS. 14A and 14B show a brushless DC motor according to exemplary embodiment 9 of the present invention. FIGS. 15A and 15B show another brushless DC motor. Elements which are basically the same as those in embodiments 5 to 8 are denoted by the same reference numerals, and description thereof is omitted.

The motor of embodiment 9 includes rectangular protrusion 117 on all laminated steal sheets in stator core 113. Since magnetic flux concentrates at all protrusions 117, magnetic flux passing magnetic pole position sensor 111 becomes greater, and thus an induced average output voltage becomes larger.

Exemplary Embodiment 10

A pump according to exemplary embodiment 10 using the brushless DC motor according to embodiments 1 to 9 will be described below with reference to FIGS. 16 and 17.

Figure 16:
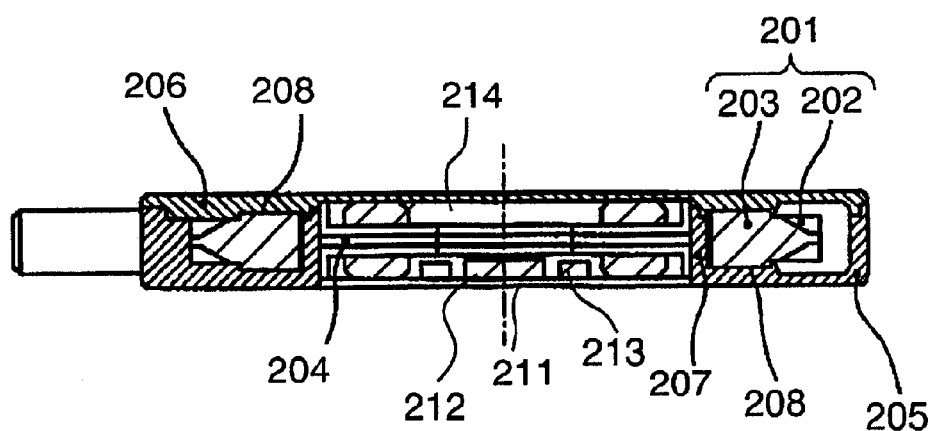
FIG. 16 is a side section view of a thin pump in accordance with exemplary embodiment 10 of the invention.
Figure 17:
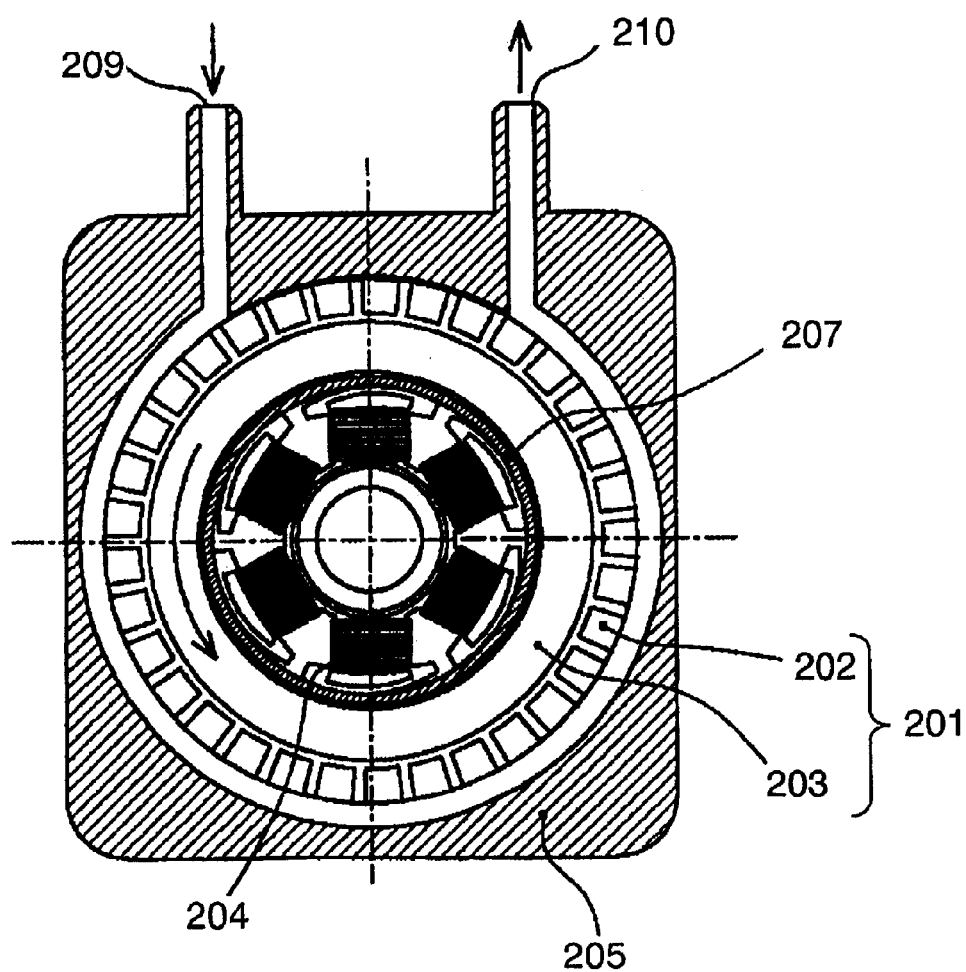
FIG. 17 is a section view seen from a rotating axis direction of the thin pump in accordance with embodiment 10.

FIG. 16 is a side section view of a thin pump according to embodiment 10, and FIG. 17 is a section view seen from a rotating direction of the pump according to embodiment 10.

Ring impeller 201 has numerous blades 202 on its outer circumference, and has rotor magnet 203 provided on its inner circumference. Blades 202 are for a regenerative pump. The pump of embodiment 10 is an ultra-thin regenerative pump. If blades 202 are turbo blades, the pump of embodiment 10 is a turbo pump. The type of pump is thus not limited.

Ring impeller 201 may be formed by fitting and integrating blades 202 and rotor magnet 203 made of a material different than blades 202. Ring impeller 201 may be made of magnetic resin, and blades 202 and rotor magnet 203 made of the same material can be integrated. Motor stator 204 is provided at the inner circumference of rotor magnet 203. Pump casing 205 accommodates ring impeller 201, and has a pump room which recovers pressure of kinetic energy given to fluid from inlet 209 by ring impeller 201 to lead the fluid to outlet 210. Casing cover 206 is included in pump casing 205, and seals the pump room accommodating ring impeller 201. Cylindrical unit 207 disposed between motor stator 204 and rotor magnet 203 is formed in pump casing 205. Cylindrical unit 207 rotatably supports impeller 201. Thrust board 208 is formed for accepting a thrust load generated at the side face of impeller 201. Thrust board 208 is formed on casing cover 206. Driver IC 212 disposed on substrate 211 controls the rotation of the brushless DC motor based on a signal from magnetic pole position sensor 213, and operates the pump. Molded part 214 molds and secures motor stator 204 and substrate 211 to cylindrical unit 207 of pump casing 205.

An operation of the ultra-thin pump according to embodiment 10 will be described. When power is supplied from an external power source, a current controlled by an electric circuit on substrate 211 flows into motor stator 204, and generates a rotating magnetic field. The rotating magnetic field acts on rotor magnet 203 to generate a physical force in rotor magnet 203. Rotor magnet 203 is integrated with ring impeller 201,and ring impeller 201 is supported rotatably with cylindrical unit 207 of pump casing 205. Therefore, the physical force generates a rotating torque on ring impeller 201 to rotate ring impeller 201. Blades 202 disposed on the outer circumference of ring impeller 201 give kinetic energy to the fluid flowing from inlet 209 by the rotation of ring impeller 201. The kinetic energy gradually increases pressure of the fluid in pump casing 205, and dispenses the fluid through outlet 210. Even when the thrust load varies due to variations in pump load or the pump's installation conditions, the pump operates steadily and reliably since thrust board 208 absorbs the thrust load of ring impeller 201.

As described above, in embodiment 10, the brushless DC motor according to embodiments 1 to 9 provides an ultra-thin pump. More specifically, its thickness may be reduced to about 5 mm. In addition, this provides an inexpensive pump with a simple structure by integrating blades 202, rotor magnet 203, and a rotating shaft.

Exemplary Embodiment 11

Figure 18:
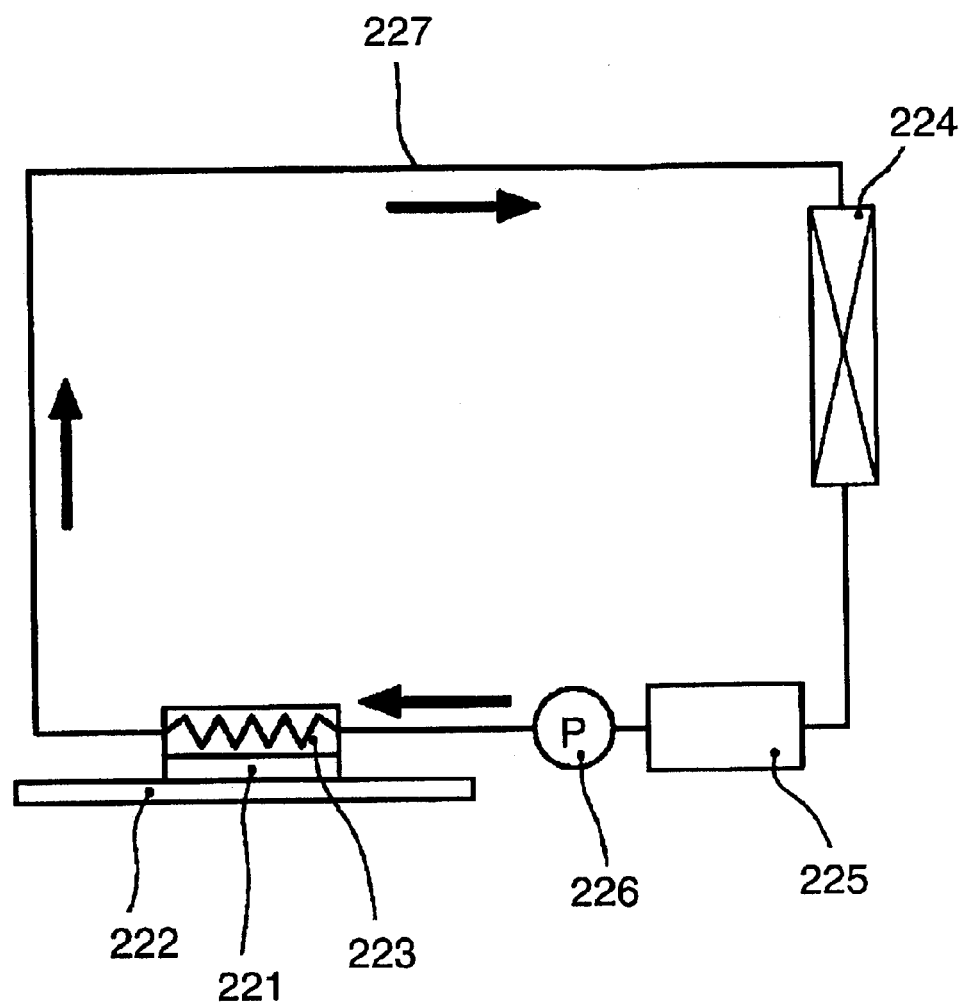
FIG. 18 shows a configuration of a cooling system including the thin pump in accordance with exemplary embodiment 11 of the invention.

FIG. 18 shows the configuration of a cooling system according to embodiment 11 using an ultra thin pump.

In FIG. 18, cooler 223 cools heat-generating component 221 mounted on substrate 222 by exchanging heat between heat-generating component 221 and refrigerant. Heat sink 224 removes heat from the refrigerant. Reserve tank 225 stores the refrigerant. Ultra thin pump 226 circulates the refrigerant. Piping 227 connects these components. The cooling system of embodiment 11 using the ultra thin pump cools electronic components, i.e., heat-generating components 221, in small personal computers. Ultra thin pump 226 of embodiment 11 is identical to the pump according to embodiment 10.

An operation of the cooling system according to embodiment 11 will be described. The refrigerant in reserve tank 225 is discharged from ultra thin pump 226, and fed to cooler 223 through piping 227. The temperature of the refrigerant increases by taking the heat of heat-generating component 221, and the refrigerant is fed to heat sink 224. The refrigerant is cooled in heat sink 224 and returns to reserve tank 225. Ultra thin pump 226 circulates the refrigerant for cooling heat-generating component Accordingly, electronic components in a small personal computer are cooled for stable operation.

As described above, according to embodiment 11, ultra thin pump 226 for circulating the refrigerant allows the entire cooling system to be thin. Upon this cooling, system being used for cooling electronic components in a small personal computer, a thinner computer is provided, and the computer is cooled efficiently. A failure in the cooling system due to frozen refrigerant at cold districts is preventable by using antifreezing fluid for the refrigerant. In addition, malfunction of electronic components if the refrigerant is leaked is also preventable by using inactive fluoric fluid for the antifreezing fluid.

Pump 226, upon being used as a regenerative pump with a deep draft and a high capability to discharge bubbles, secures a necessary flow rate even in a circulating system having high pipeline resistance. This enables cooler 223 and heat sink 224 to be thinner, and provides smaller pipe 227, thus further downsizing and slimming the cooling system. Furthermore, even if air enters the pipe, ultra thin pump 226 can continuously discharge the air to reserve tank 225 without air bubble staying in the he pump performance, i.e., cooling performance, is thus not degraded. The relationship of angles between the teeth according to embodiment 3 may cable to the motor of embodiments 5 to 11.

Exemplary Embodiment 12

Figure 20A:
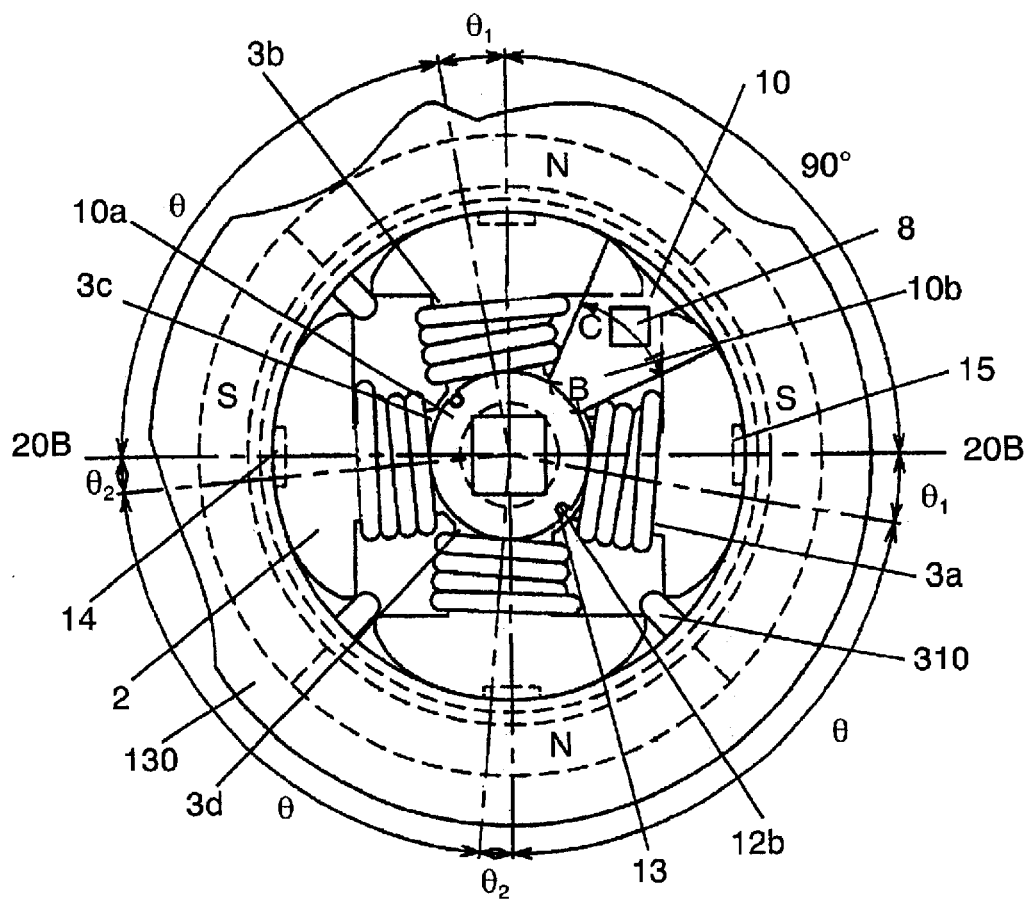
FIG. 20A and FIG. 20B show a stator core
Figure 20B:
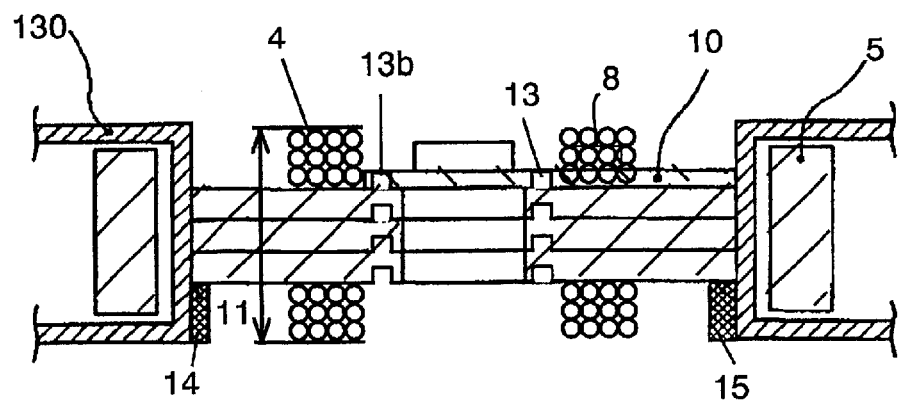

FIG. 20A and FIG. 20B show a brushless DC motor according to exemplary embodiment 12. Reference numerals identical to those of embodiments 1 to 4 denote like elements, which will be described in no more detail.

The motor according to embodiment 12 has features of that of embodiments 1 to 4, and includes protrusion 310 on a side wall facing salient pole 2 of separator 130 between salient poles 2 adjacent to each other.

What is claimed is:

1. A motor comprising:
   an armature including:
      a stator core having a plurality of teeth and a plurality of salient poles disposed at respective tips of said plurality of teeth; and
      a plurality of coils wound around said plurality of teeth, respectively;
   a magnet rotor facing said plurality of salient poles;
   a sensor for detecting a magnetic pole position of said magnet rotor;
   a driver for controlling respective currents flowing through said plurality of coils according to a signal output by said sensor; and
   a substrate including:
      a central substrate portion disposed at a center of said stator core, said driver being mounted on said central substrate portion; and
      an arm substrate portion extending from said central substrate portion to said salient pole, said arm substrate portion being accommodated between two of said plurality of coils, said sensor being mounted on said arm substrate portion
   wherein said stator core has a surface perpendicular to an axis of rotation of said magnet rotor, said substrate being mounted on said surface of said stator core.

2. The motor as defined in claim 1, wherein said sensor and said driver are disposed on a side of said substrate closest to said armature.

3. The motor as defined in claim 1,
   wherein said stator core has a protrusion, and
   wherein said substrate has a hole which engages said protrusion.

4. The motor as defined in claim 3,
   wherein said stator core includes a plurality of laminated steel sheets having caulking portions, respectively, said plurality of steel sheets being joined to each other with said caulking portions, and
   wherein at least one of said caulking portions functions as said protrusion.

5. The motor as defined in claim 1, wherein a pitch angle between two of said plurality of teeth adjacent to said arm substrate portion is wider than an equal pitch angle.

6. The motor as defined in claim 5, wherein a pitch angle between a remainder of said teeth other than said two of said plurality of teeth is narrower than said equal pitch angle.

7. The motor as defined in claim 6,
   wherein a pitch angle between said two of said plurality of teeth is wider than said equal pitch angle by an angle ($\theta_1$ deg) for each of said two of said plurality of teeth, and
   wherein said angle ($\theta_1$ deg) and said pitch angle ($\theta$ deg) between said adjacent teeth other than said two of said plurality of teeth satisfy:

$$\theta=(360/n)-2\theta_1/(n-1)(\deg),$$

where n is the number of said plurality of teeth of said stator core.

8. The motor as defined in claim 1 further comprising:
   a separator disposed between said magnet rotor and said armature;
   a press-fitting stopper disposed on said separator, said press-fitting stopper being shaped and arranged to restrict axial movement of said armature in a direction along the axis of rotation; and a substrate fixing stopper disposed on said separator, said substrate fixing stopper being shaped and arranged to restrict axial movement of said substrate in a direction along the axis of rotation.

9. The motor as defined in claim 1, wherein said sensor is placed within a height of said plurality of coils in a direction parallel to the axis of rotation of said magnet rotor.

10. The motor as defined in claim 9, wherein said driver is coupled with said stator core within said height of said plurality of coils.

11. The motor as defined in claim 10,
wherein said stator core has a member defining a hole at a center of said stator core, and
wherein at least a part of said driver is placed in said hole.

12. A motor comprising:
a stator core including a plurality of teeth and a plurality of salient poles disposed at respective tips of said plurality of teeth;
a plurality of coils wound around said plurality of teeth, respectively;
a magnet rotor facing said plurality of salient poles; and
a sensor disposed in a space surrounded by said plurality of coils and said plurality of salient poles, said sensor being mounted on said stator core and being operable to detect a magnetic pole position of said magnet rotor,
wherein a distance between two of said plurality of teeth between which said sensor is disposed is longer than a distance between a remainder of said plurality of teeth other than said two of said plurality of teeth.

13. The motor as defined in claim 12, wherein said stator core includes a protrusion to which said sensor is mounted, said protrusion being provided between said two of said plurality of teeth.

14. The motor as defined in claim 13, wherein said stator core includes a plurality of laminated steel sheets, and said protrusion is provided on at least one of said plurality of steel sheets.

15. The motor as defined in claim 12, wherein a pitch angle between said remainder of said plurality of teeth other than said two of said plurality of teeth is narrower than an equal pitch angle.

16. The motor as defined in claim 15,
wherein a pitch angle between said two of said plurality of teeth is wider than said equal pitch angle by an angle ($\theta_1$ deg) for each of said two of said plurality of teeth, and
wherein said angle ($\theta_1$ deg) and said pitch angle ($\theta$ deg) between said otter remainder of said plurality of teeth other than said two of said plurality of teeth satisfy:

$$\theta = (360/n) - 2\theta_1/(n-1)(\text{deg}),$$

where n is the number of said plurality of teeth of said stator core.

17. The motor as defined in claim 12, wherein said sensor is placed within a height of said plurality of coils in a direction parallel to an axis of rotation of said magnet rotor.

18. The motor as defined in claim 17, further comprising:
a driver for controlling respective currents flowing through said plurality of coils according to a signal output by said sensor,
wherein said driver is coupled with said stator core within said height of said plurality of coils.

19. The motor as defined in claim 18,
wherein said stator core has a member defining a hole at a center of said stator core, and
wherein at least a part of said driver is placed in said hole.

20. A motor comprising:
a stator core including a plurality of teeth and a plurality of salient poles provided at respective tips of said plurality of teeth;
a plurality of coils wound around said plurality of teeth, respectively;
a magnet rotor facing said plurality of salient poles;
a protrusion provided at said stator core between two of said plurality of teeth; and
a sensor mounted to said protrusion, for detecting a magnetic pole position of said magnet rotor.

21. The motor as defined in claim 20,
wherein said stator core includes a plurality of laminated steel sheets, and
wherein said protrusion is provided on at least one of said plurality of steel sheets.

22. The motor as defined in claim 20, wherein said protrusion has a triangle shape.

23. The motor as defined in claim 20, wherein said protrusion has a rectangle shape.

24. The motor as defined in claim 20, wherein a pitch angle between two of said plurality of teeth adjacent to said protrusion is wider than an equal pitch angle.

25. The motor as defined in claim 24, wherein a pitch angle between a remainder of said teeth other than said two of said plurality of teeth is narrower than said equal pitch angle.

26. The motor as defined in claim 15,
wherein a pitch angle between said two of said plurality of teeth is wider than said equal pitch angle by an angle ($\theta_1$ deg) for each of said two of said plurality of teeth, and
wherein said angle ($\theta_1$ deg) and said pitch angle ($\theta$ deg) between said remainder of said plurality of teeth other than said two of said plurality of teeth satisfy:

$$\theta = (360/n) - 2\theta_1/(n-1)(\text{deg}),$$

where n is the number of said plurality of teeth of said stator core.

27. The motor as defined in claim 20,
wherein said sensor is placed within a height of said plurality of coils in a direction parallel to axis of rotation of said magnet rotor.

28. The motor as defined in claim 22, further comprising:
a driver for controlling respective currents flowing through said plurality of coils according to a signal output by said sensor,
wherein said driver is coupled with said stator core within said height of said plurality of coils.

29. The motor as defined in claim 28,
wherein said stator core has a member defining a hole at a center of said stator core, and
wherein at least a part of said driver is placed in said hole.

30. A motor comprising:
an armature including:
a stator core having a plurality of teeth and a plurality of salient poles disposed at respective tips of said plurality of teeth; and
a plurality of coils wound around said plurality of teeth, respectively;

a magnet rotor facing said plurality of salient poles;

a sensor for detecting a magnetic pole position of said magnet rotor;

a driver for controlling respective currents flowing through said plurality of coils according to a signal output by said sensor; and a substrate including:

a central substrate portion disposed at a center of said stator core, said driver being mounted on said central substrate portion; and an arm substrate portion extending from said central substrate portion to said salient pole, said arm substrate portion being accommodated between two of said plurality of coils, said sensor being mounted on said arm substrate portion;

wherein a pitch angle between two of said plurality of teeth adjacent to said arm substrate portion is wider than an equal pitch angle by a pitch angle ($\theta_1$ deg) for each of said two of said plurality of teeth; and wherein said pitch angle ($\theta_1$ deg) and a pitch angle ($\theta$ deg) between a remainder of said plurality of teeth other than said two of said plurality of teeth satisfy:

$$\theta = (360/n) - 2\theta_1/(n-1)(\text{deg}),$$

where n is the number of said plurality of teeth of said stator core.

31. The motor as defined in claim 30, wherein said sensor and said driver are disposed on a side of said substrate closest to said armature.

32. The motor as defined in claim 30, wherein said stator core has a protrusion, and wherein said substrate has a hole which engages said protrusion.

33. The motor as defined in claim 32, wherein said stator core includes a plurality of laminated steel sheets having caulking portions, respectively, said plurality of steel sheets being joined to each other with said caulking portions, and wherein at least one of said caulking portions functions as said protrusion.

34. The motor as defined in claim 30, further comprising:

a separator disposed between said magnet rotor and said armature;

a press-fitting stopper disposed on said separator, said press-fitting stopper being shaped and arranged to restrict axial movement of said armature in a direction along the axis of rotation; and a substrate fixing stopper disposed on said separator, said substrate fixing stopper being shaped and arranged to restrict axial movement of said substrate in a direction along the axis of rotation.

35. The motor as defined in claim 30, wherein said sensor is placed within a height of said plurality of coils in a direction parallel to an axis of rotation of said magnet rotor.

36. The motor as defined in claim 35, further comprising:

a driver for controlling respective currents flowing through said plurality of coils according to a signal output by said sensor, wherein said driver is coupled with said stator core within said height of said plurality of coils.

37. The motor as defined in claim 36, wherein said stator core has a member defining a hole at a center of said stator core, and wherein at least a part of said driver is placed in said hole.

38. A motor comprising:

a stator core including a plurality of teeth and a plurality of salient poles disposed at respective tips of said plurality of teeth;

a plurality of coils wound around said plurality of teeth, respectively;

a magnet rotor facing said plurality of salient poles; and a sensor disposed in a space surrounded by said plurality of coils and said plurality of salient poles, said sensor being mounted on said stator core and being operable to detect a magnetic pole position of said magnet rotor, wherein a distance between two of said plurality of teeth between which said sensor is disposed is longer than a distance between a remainder of said plurality of teeth other than said two of said plurality of teeth;

wherein a pitch angle between said two of said plurality of teeth is wider than an equal pitch angle by a pitch angle ($\theta_1$ deg) for each of said two of said plurality of teeth; and wherein said pitch angle ($\theta_1$ deg) and a pitch angle ($\theta$ deg) between a remainder of said plurality of teeth other than said two of said plurality of teeth satisfy:

$$\theta = (360/n) - 2\theta_1/(n-1)(\text{deg}),$$

where n is the number of said plurality of teeth of said stator core.

39. The motor as defied in claim 38, wherein said stator core includes a protrusion to which said sensor is mounted, said protrusion being provided between said two of said plurality of teeth.

40. The motor as defined in claim 39, wherein said stator core includes a plurality of laminated steel sheets, and said protrusion is provided on at least one of said plurality of steel sheets.

41. The motor as defined in claim 38, wherein said sensor is placed within a height of said plurality of coils in a direction parallel to an axis of rotation of said magnet rotor.

42. The motor as defined in claim 41, further comprising:

a driver for controlling respective currents flowing through said plurality of coils according to a signal output by said sensor, wherein said driver is coupled with said stator core within said height of said plurality of coils.

43. The motor as defined n claim 42, wherein said stator core has a member defining a hole at a center of said stator core, and wherein at least a part of said driver is placed in said hole.

* * * * *